United States Patent [19]
Baker et al.

[11] Patent Number: 4,782,241
[45] Date of Patent: Nov. 1, 1988

[54] UNINTERRUPTIBLE POWER SUPPLY APPARATUS AND POWER PATH TRANSFER METHOD

[75] Inventors: Robert W. Baker, Westerville; James K. Martin, Columbus, both of Ohio; Leonard E. Orsak, Los Altos, Calif.

[73] Assignee: Liebert Corporation, Columbus, Ohio

[21] Appl. No.: 84,305

[22] Filed: Aug. 11, 1987

[51] Int. Cl.$^4$ .............................................. H02J 9/06
[52] U.S. Cl. ....................................... 307/66; 307/87
[58] Field of Search .................... 307/66, 64, 87, 85, 307/86; 323/267, 308

[56] References Cited

U.S. PATENT DOCUMENTS 4,366,389 12/1982 Hussey .................................. 307/66
4,556,802 12/1985 Harada et al. ........................ 307/66

Primary Examiner—William M. Shoop, Jr.
Assistant Examiner—Sharon D. Logan
Attorney, Agent, or Firm—Mueller and Smith

[57] ABSTRACT

An uninterruptible power supply capability is provided for line regulators of a variety synthesizing a desired waveshape for presentation to a critical load. A static switch is active intermediate the input of the line regulator and the line power supply to provide a power path during normal operation. Upon the occurrence of a line defect, a stand-by power path is provided which includes a source of d.c. stand-by energy such as rechargeable batteries which supply input to an unregulated inverter which, in turn, provides an unregulated input through an inductance to the input of the line regulator. Transfer is achieved by preliminary voltage level adjustment at the inverter and the inverter itself is employed to assure commutation off of the switching components of the static switch. Detection of line fault is made by detecting any instantaneous phase shift in the line input.

39 Claims, 21 Drawing Sheets

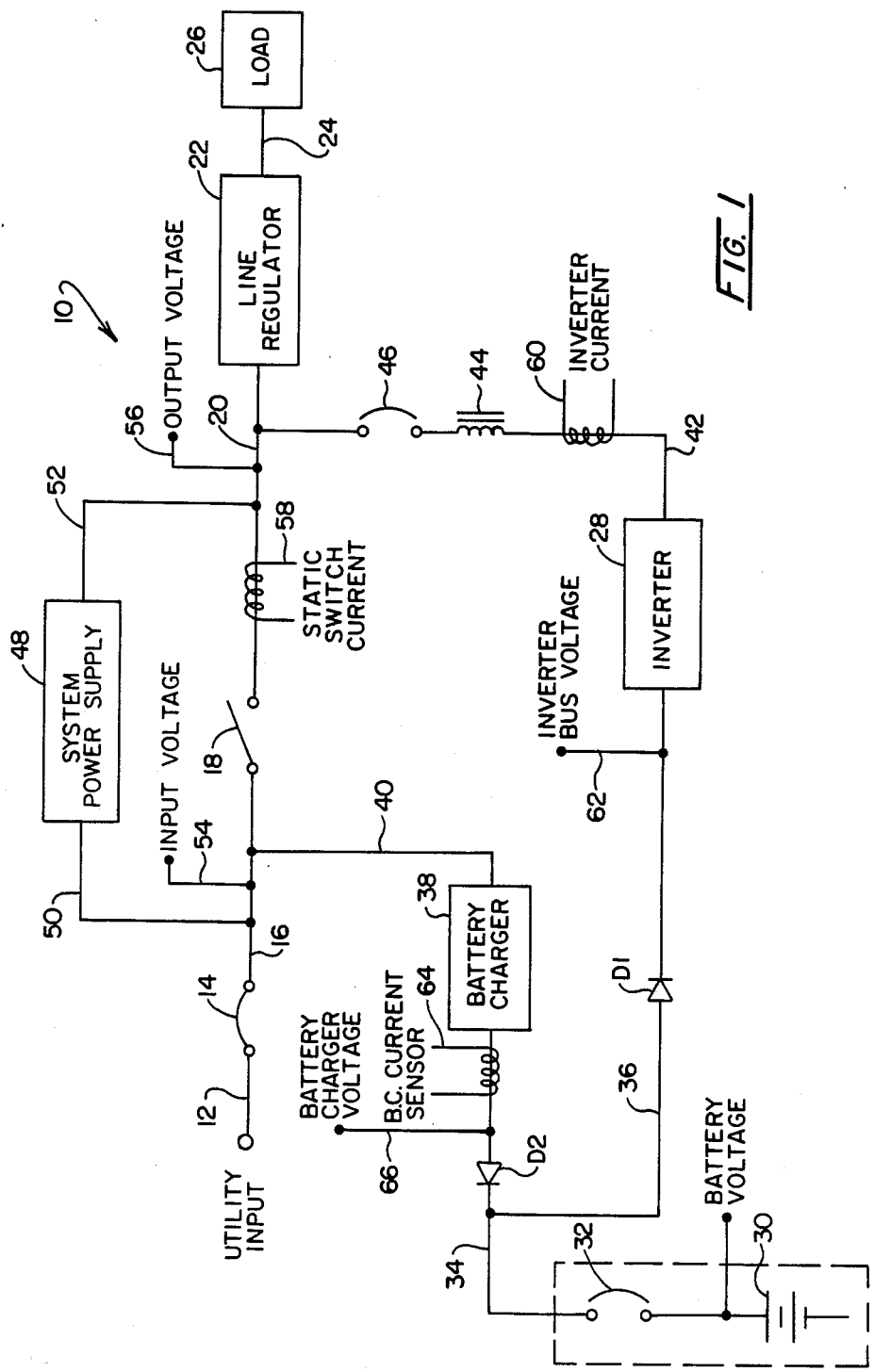

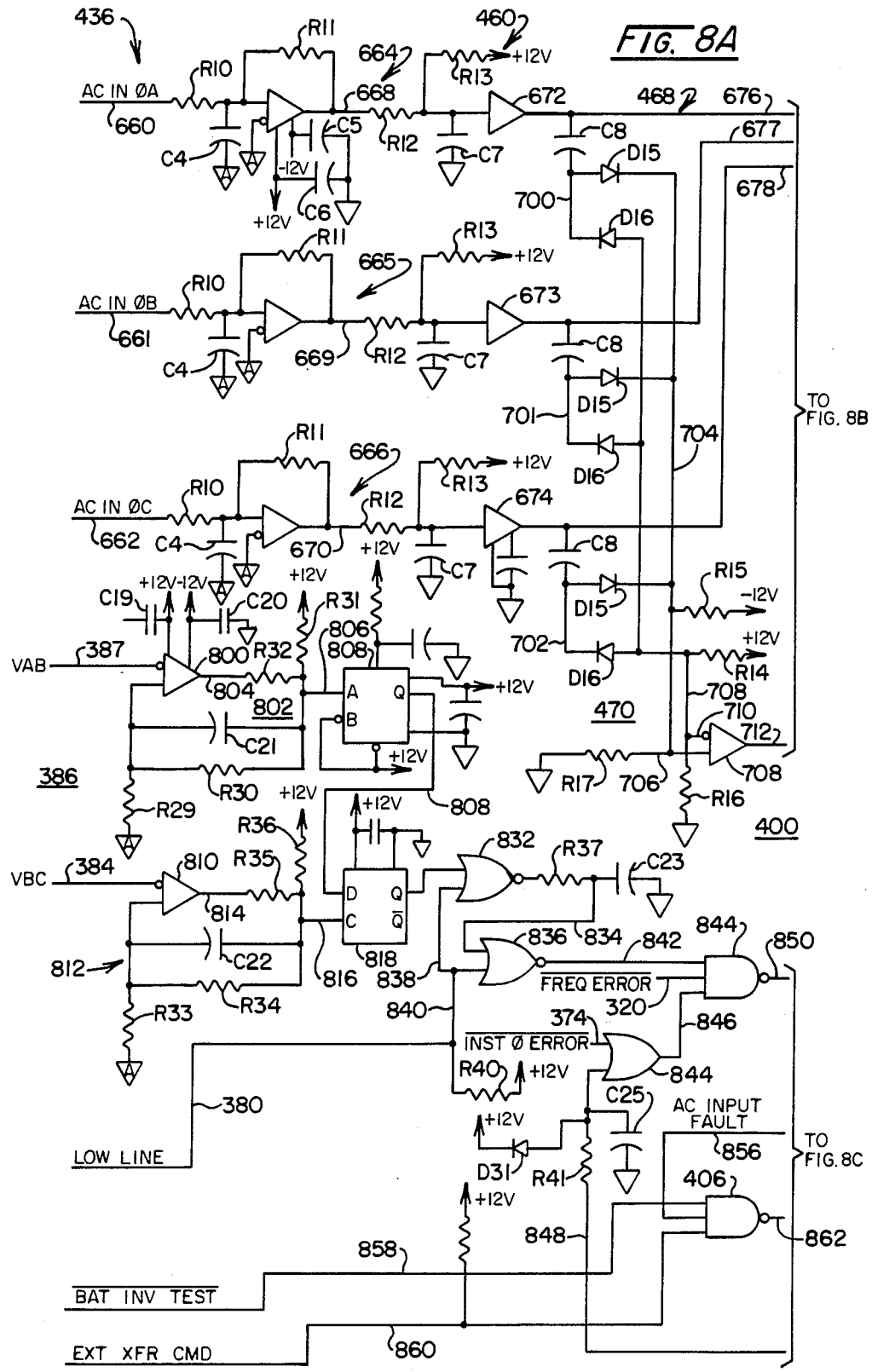

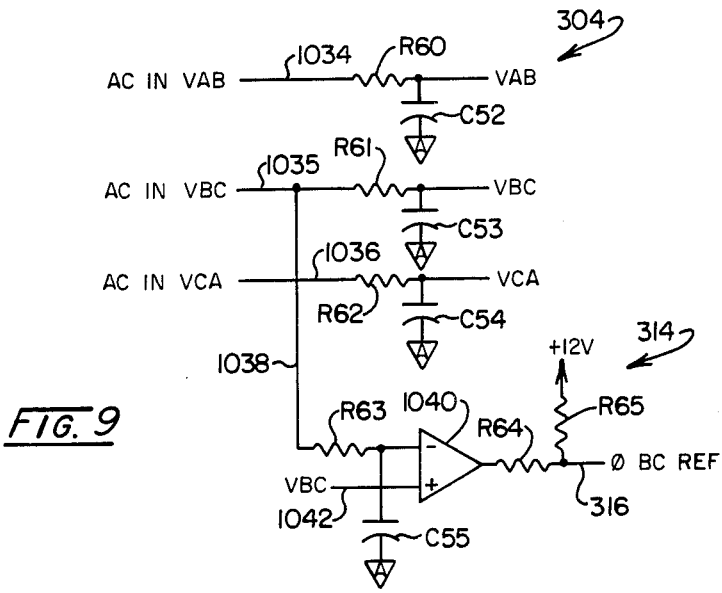
FIG. 9
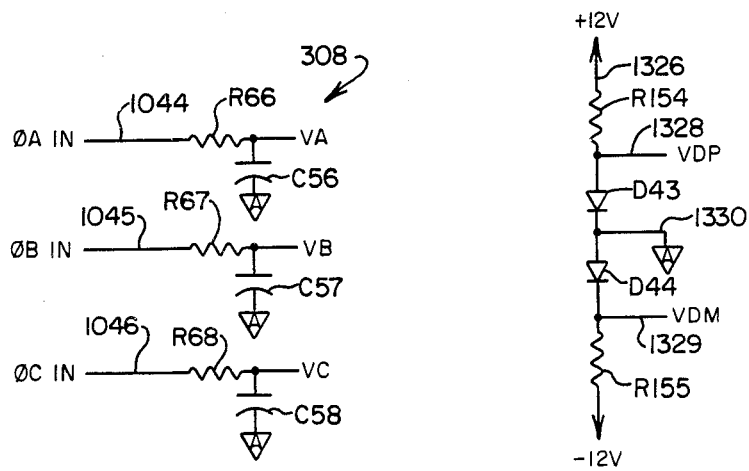
FIG. 10
FIG. 14

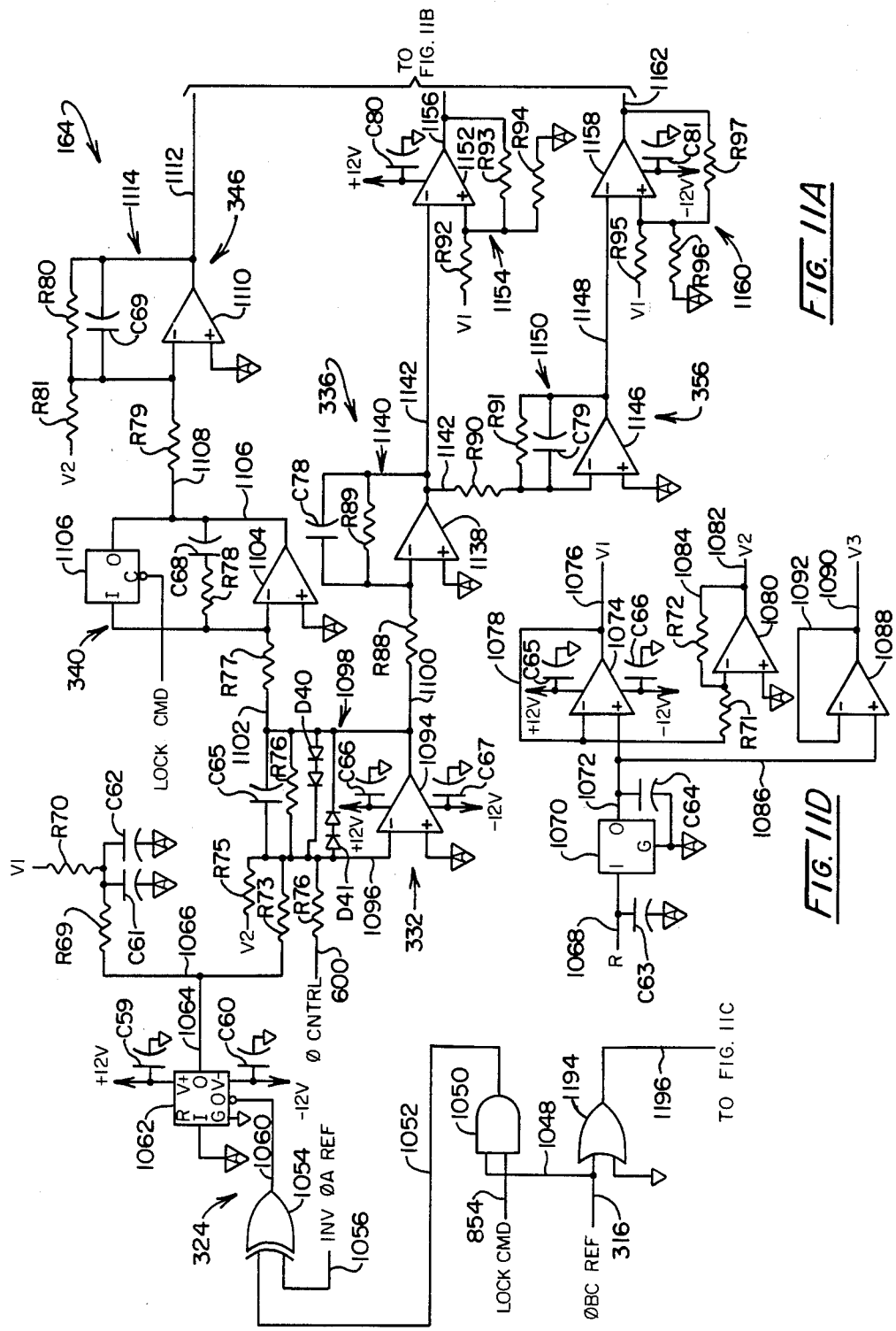

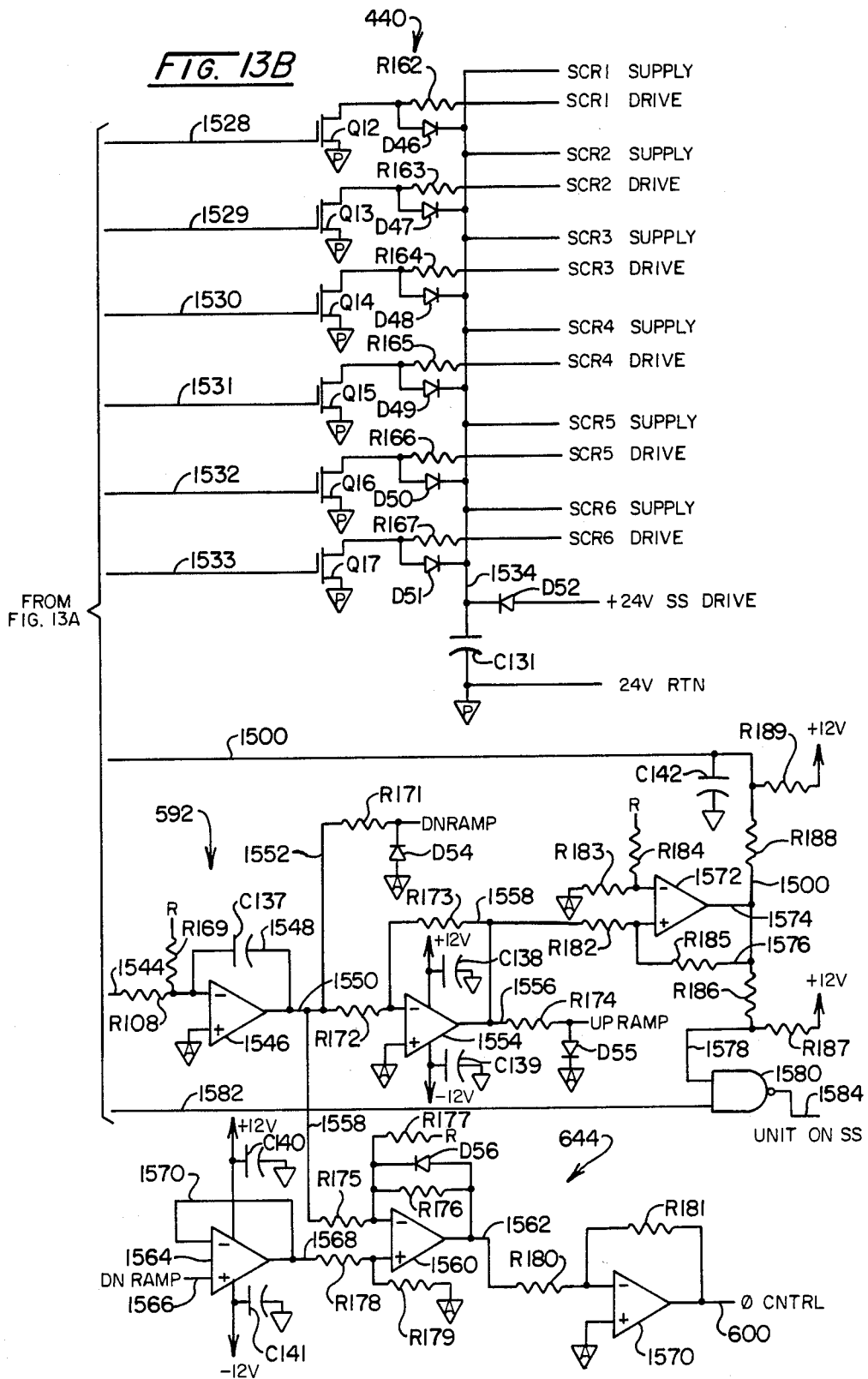

UNINTERRUPTIBLE POWER SUPPLY APPARATUS AND POWER PATH TRANSFER METHOD

BACKGROUND

Sophisticated, critical electronic systems require power supplies evidencing the attributes of very high quality and reliability. These attributes generally are not available from the power supplied through typical utility organizations. As a consequence, the users of such systems have resorted to various techniques for power input improvement. The more elaborate approach to power supply improvement is provided by uninterruptible power supply (UPS) systems. These systems exhibit a desirably high level of power assurance, providing stand-by or "ride through" power in the event of complete line outage as well as providing waveform regulation. Typically, the design approach taken for UPS systems includes the provision of rechargeable batteries as a first level of stand-by power. These batteries are associated with an a.c. utility input through a d.c. node level generated by rectifying and treating the line input. The thus-developed d.c. energy then is converted to an a.c. output by an appropriate inverter and filter stage or stages. Such inverter typically are elaborate devices due particularly to the waveform regulation features incorporated in them. Generally in a UPS arrangement, the inverter component of the system is continually "on-line" or operating in serial association with the power path. Because these inverter devices may fail from time-to-time, their performance usually is monitored and a rapid switching technique is provided which employs solid-state switches to respond to such failure and transfer the system to direct utility power. The "static switches" used for this switching function conventionally employ silicon controlled rectifier (SCR) devices operating in conjunction with a control circuit functioning to gate them into conduction and to force commutate them off, when necessary, i.e. the solid-state devices are turned off by, in effect, reversing current through them where the time required for "natural" commutation by polarity reversal is considered excessive.

SCRs may be categorized as a form of power device, exhibiting internal regenerative characteristics such that they tend to accommodate heavy surge overloads. Correspondingly, currently produced power transistor devices, which may also be used for the instant purpose, generally are unable to accommodate power vagaries. Thus, the SCR usually is elected as the control element for the static switch function of UPS systems, and commutation considerations usually accompany design requirements. Utility derived power treatment not incorporating stand-by power supplies as above discussed conventionally has been provided by motor generators or voltage synthesizers. The former devices are electric motor driven generators wherein utility power is applied to the prime mover or motor and the resultant power output of the driven generator is one of controlled waveshape. Because of the mechanical inertia involved in such a combination of components, aberrations in input waveshape and the like are not transmitted through the system. However, these devices necessarily incorporate moving mechanical components which eventually will wear and fail without adequate surveillance.

Recently, a polyphase ferroresonant voltage stabilizer or synthesizer has been successfully introduced to the marketplace. In their elementary form, such synthesizers comprise a regulator which is fashioned as a non-linear saturable transformer arranged in parallel with a capacitor assemblage which is supplied from the line source through an input inductor. The saturable transformer components and capacitors form a ferroresonant circuit wherein the reactive components operate beyond the knee of a conventional magnetization curve. Described in U.S. Pat. No. 4,305,033 by Jeffrey M. Powell, the noted ferroresonant voltage stabilizer or synthesizer enjoys advantages of economic construction and efficient performance while remaining immune from certain unsatisfactory characteristics related to stability and reliability which previously had been associated with resonating circuits. Improvement in terms of operational efficiency, size and cost for such synthesizers are described in U.S. Pat. No. 4,544,877 by Powell. While voltage synthesizers such as the Powell apparatus have experienced important acceptance in the marketplace, particularly in conjunction with computer room installations, the devices as presently constituted do not have the capability of providing stand-by power in the event of utility line power outage. As the user of these devices have expanded their facilities requiring assured power inputs, a need has arisen for enhancing the synthesizer so as to develop a UPS capability within reasonable cost constraints.

SUMMARY

The present invention is addressed to a method, apparatus and system wherein a wave synthesizing line regulator is enhanced to provide uninterruptible power supply performance. Because of the waveshape synthesizing capability of the line regulator, any input supplied to it from a stand-by power path advantageously may be simple, to the extent that a squarewave of varying voltage level is acceptable. Thus, less elaborate inverter structures may be employed to develop this secondary power path.

To provide for transfer from a regular or line source power path to a stand-by power path, the circuit architecture of the instant invention positions a conventional static switch within the primary power path and actuates it such that it is in a continually conductive state. Thus, when a transfer to the stand-by power path is called for, it becomes necessary to assure that the static switch is commutated to a non-conducting condition while a supply of power is taken over by a stand-by source and associated inverter. Such assured commutation is uniquely provided through the use of the inverter itself in conjunction with an arrangement for monitoring the direction of any current flow through the components of the static switch. The invention also features a unique arrangement for transferring from the stand-by power path back to the line source power path. This is carried out by a controlled firing of the components of the static switch in a manner gradually building the voltage values of the squarewave outputs through an inductive summing arrangement.

Another feature of the invention is to provide apparatus for use with a waveform synthesizing line regulator having an input and an output connectable with the load. This apparatus is connectable with a line power source of given frequency, variable voltage of given peak value and waveshape. A static switch is connected intermediate the source and the line regulator input and is actuable between conducting and non-conducting states for selectively conveying power from the source to the regulator input. An arrangement for providing a stand-by source of d.c. power such as a rechargeable battery is provided and an inverter is included which employs a d.c. energy source bus means for connection in energy exchange relationship with the stand-by source. Further the inverter employs solid-state switches which are coupled with the d.c. bus and are responsive to switch control signals to provide an inverter active state for deriving an unregulated power input to the line regulator input at the noted given frequency. The inverter exhibits a non-switching stand-by state in the absence of these switch control signals. A control is provided for monitoring the condition of the line power source and which is responsive to predetermined defects in that source to actuate the static switch from its conducting to non-conducting state and to apply to switch control signals to the solid-state switch so as to provide the active state control of the inverter and effect transfer of power flow from the static switch to the inverter.

Another feature of the invention is to provide an apparatus for use with a waveform synthesizing line regulator having an input connectable with a line power source of given frequency, voltage and sinusoidal waveform. A static switch is provided which is connectable intermediate the source and the line regulator input and which is actuable into a conducting state and commutatable to a non-conducting condition in the absence of that actuation. A stand-by source d.c. power is provided which cooperates with an inverter including a d.c. storing arrangement for connection in energy exchange relationship with the stand-by source. The inverter includes solid-state switches responsive to switch control signals to derive an unregulated, substantially square waveform from the d.c. energy storing arrangement at an inverter output. An inductor is connectable intermediate the inverter output and the line regulator input for providing current flow limitation. A control arrangement is within the apparatus which includes a transfer circuit which comprises a line responsive arrangement for monitoring the condition of the line power source and which has a transfer condition in response to predetermined defects in the line power source. An inverter oscillator provides select switch control signals and a phase lock network is controllable for selectively synchronizing the switch control signals with the line power source waveform. A transfer control is responsive to the transfer condition for effecting static switch commutation in applying the switch control signals to the solid-state switches of the inverter to derive the square waveform at the inverter output for application to the line regultor input through the inductor. A reacquire circuit is provided for transferring power flow to the line regulator input from the inverter and associated stand-by source of d.c. power to the line power source. This circuit includes a graduated firing circuit which responds to the line monitoring for deriving a reacquire switching output for effecting a select actuation of the static switch during each half-cycle of the line sinusoid waveform to sum energy from that source with the inverter square waveform and effect a corresponding elevation of the voltage amplitude at the inverter d.c. energy storing or bus arrangement. This occurs until a correspondence with the peak voltage amplitude of the line power source waveform is developed. Upon the occurrence of the latter situation, full actuation of the static switch is carried out.

Another feature of the invention provides an uninterruptible power supply system connectable between a load and a line power source of given frequency, variable voltage and waveshape, which comprises a static switch having an input connectable with the line power source and controllable to selectively convey power from an input to an output thereof. An auxiliary power arrangement provides a stand-by d.c. source and an inverter having an input connected with the d.c. source provides an a.c. power output substantially at the given frequency and an inverter output. A line regulator is connectable with the load having an input coupled with inverter output and with the static switch output for synthesizing an output waveform of regulated voltage substantially at the given frequency. A control monitors the condition of the line power source and responds to predetermined defects therein to terminate the conveyance of power by the static switch and effect the provision of a.c. power output from the inverter to the line regulator input.

Another aspect of the invention provides, an uninterruptible power supply system in which a first power path is provided wherein line a.c. power of first phase is applied through a static switch having actuable switching components to the input of waveshape synthesizing line regulator coupled to a load and wherein a second power path is provided in which a stand-by source of d.c. power supplies stand-by power to the regulator input through an inverter having switching components actuable for switching an applied d.c. voltage to derive an unregulated squarewave output of second phase, the method for transferring from the second power path to the first power path which includes the steps of providing an inductor in common with the outputs of the static switch and the inverter; synchronizing the first and second phases in a manner wherein one is retarded a predetermined amount with respect to the other; actuating the static switch switching components to conduct during portions of the cycles of the line input to effect conveyance of gradually increasing amounts of cycle defined energy to the inductor for voltage summing with the squarewave to gradually elevate the value of the applied d.c. voltage and de-activating the inverter switching components when the applied d.c. voltage corresponds with the peak values of voltage exhibited by a line input a.c. power.

Another feature of the invention provides the method for transferring from the above-noted first power path to the above-noted second power path which comprises monitoring currents through the static switching components and deriving directions signals representing the direction thereof; actuating the static switch switching components to a commutatable off state; actuating the inverter switch components in correspondence with the direction signals to effect commutation off of the static switching components; determining whether the commutation is effective or ineffective; and actuating the inverter switch components to derive the time varying output at the given frequency when the commutation is determined to be effective.

Objects of the invention will, in part, be obvious and will, in part, appear hereinafter.

The invention, accordingly, comprises the apparatus, method and system possessing the construction, combination of elements, arrangement of parts and steps which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 1 is a schematic block diagram of the system and apparatus of the invention;

FIGS. 8A–8D combine as labelled to describe a control circuit according to the instant invention;

FIG. 9 is an electrical schematic diagram showing treatment of line-to-line input voltages;

FIG. 10 is an electrical schematic diagram showing the treatment of line-to-neutral input signals for three phases;

FIGS. 11A–11C are electrical schematic diagrams which are associated as labelled and show the phase lock loop and oscillator components of the apparatus of the invention;

FIG. 11D is an electrical schematic drawing showing a circuit for generating stable reference voltages;

FIGS. 13A–13B combine as labelled to provide an electrical schematic drawing of a reacquisition circuit according to the invention;

FIG. 14 is an electrical schematic drawing showing components for deriving reference voltages;

DETAILED DESCRIPTION

Figure 2A:
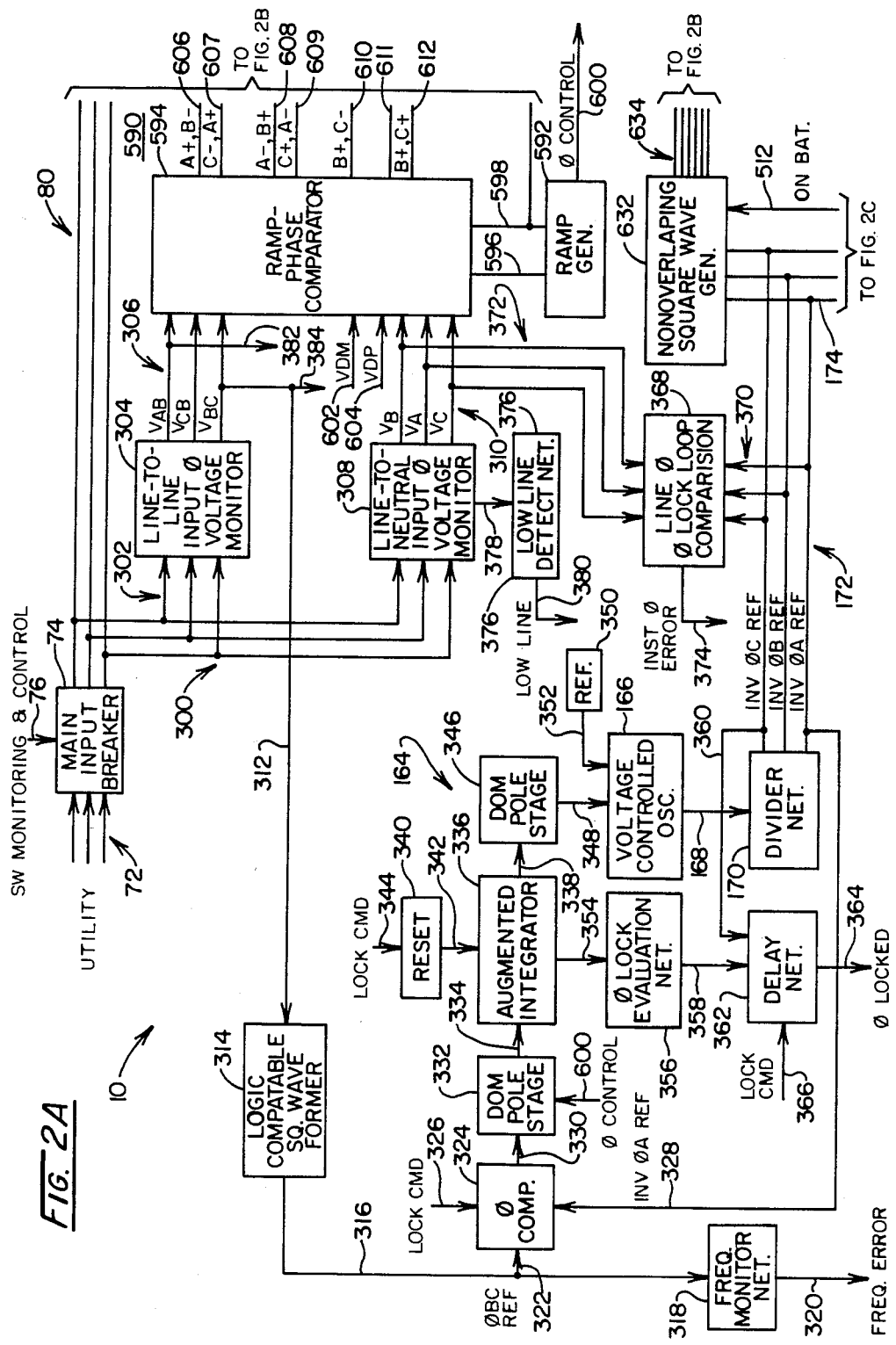
FIGS. 2A–2C combine as labelled to form a more detailed block schematic diagram of the apparatus and system of FIG. 1.

In distinguishment from conventional UPS systems, the apparatus of the present invention exhibits a power flow which is normally, in the sense of a utility derived line source, through an electronically controlled solid-state switch conventionally referred to as a "static switch". On the occasion of a line default, this switch is commutated off and the power flow then commences through an inverter from a stand-by power supply or source such as a battery. Because the output of the inverter as well as the static switch from the line source input is directed to the input of a line regulator, a relatively simplified version of an inverter, for example which provides no regulation may be employed. In the latter regard, when the power flow is from a battery stand-by source through such an inverter, the inverter may operate producing a squarewave output at voltage amplitudes corresponding with the instantaneous battery voltage outputs. The line regulator then synthesizes an appropriate sinusoid at regulated voltage levels for application to a critical load.

Looking to FIG. 1, a generalized single line schematic diagram is shown at 10 describing the UPS system at hand. Utility line input is shown commencing one portion of the power flow at line 12. Line 12 is shown being directed through a main input breaker or switch 14, the opposite side of which as represented at line 16 extends to a static switch represented at symbol 18. Designers currently favor the implementation of static switches employing silicon controlled rectifiers (SCRs) because of their power handling capabilities which, for example, will accommodate significant surges of power. These devices are coupled in anti-parallel fashion thus, during normal power flow from the line source, will be gated into conduction on a continuous axis. However at such time as a transfer to inverter derived input to the line regulator is required, it is necessary to commutate the SCRs to an off state which requires not only removing the gate input to them but also applying a reverse voltage bias for a requisite interval of time.

The output of the static switch 18 is directed, as represented by line 20 to the input of a sinusoid synthesizing line regulator represented at block 22. This line regulator may, for example, be provided as the voltage synthesizer described in U.S. Pat. No. 4,544,877 (supra) incorporated herein by reference. As represented at line 24, the regulated output from device 22 serves to drive a critical load as represented at block 26.

During normal operation, when the load 26 is driven from the line source or utility source emanating at line 12, the non-regulating squarewave deriving inverter as represented at block 28 is in a stand-by operational mode, the solid-state switches thereof not being actuated, however, the rails or d.c. bus components thereof are retained essentially at the voltage at line 20. Upon degradation of the source at line 12, the power flow emanates from a battery stand-by source as represented at 30 which is seen to couple through battery disconnect switch 32, line 34 and line 36 to the input of inverter 28. Isolation diode function D1 is incorporated in line 36 to isolate the inverter 28 from the battery 30 during periods of normal operation when the apparatus 10 power flow is from the utility input at line 12. In general, the bus or rails of the inverter 28 are maintained as noted above at the higher voltage level at line 20 during such periods but will drop essentially to the voltage level of battery 30 when the power flow is transferred to a path including the diode D1. Battery 30 is charged from a battery charger circuit represented at block 38. Charger circuit 38 is shown powered via line 40 from utility source input at line 16 and is directed to the battery via line 34 which is seen to incorporate an isolation diode function D2. This diode, D2, prevents power flow through the charger 38 when the battery 30 is powering the inverter 28. The output of inverter 28 at line 42 will, during the power flow from battery 30, be a squarewave, initially phase synchronized with the input at line 12 and which will exhibit a peak voltage somewhat following voltage levels at battery 30. This unregulated squarewave is directed through an inverter output choke 44 and an inverter disconnect switch 46 to the input of the line regulator 22 at line 20. Output choke function 44 serves the important function of limiting peak currents in the static switch 18 and the inverter 28 particular during a reacquire operation wherein power flow is transferred from the inverter 28 back through the static switch 18 from utility input line 12. The choke 44 also functions in the transfer from power flow through static switch 18 to the powering of the regulator 22 from battery 30 and inverter 28. Disconnect switch 46 functions to provide a disconnect in the event of inverter malfunction, but also operates at system start-up and, along with the switches 32 and 14 is controlled by an under-voltage relay mechanism which is enabled by control logic of the system. Three conditions are met to close the switch 46, to wit, the voltage must be up at regulator 22 which represents that the switch 14 is closed; the inverter 28 must be pre-charged to a voltage level slightly larger than peak line input voltage for example as witnessed at line 20 and no system fault conditions have been detected. In similar fashion, under-voltage relays control the actuation of battery disconnect switch 32. In this regard, the inverter 28 must be pre-charged to a voltage greater than that existing at battery 30; the output voltage at charger 38 must be less than battery voltage, representing a normal start-up condition; and no system fault conditions exist. The noted pre-charge of inverter 28 during such periods as it is in a stand-by or start-up condition is developed from a power supply for the system which is represented at block 48. Supply 48 is coupled to line 16 via line 50 and to line 20 via line 52, the power supply 48 also serves to develop necessary logic levels called for in the control aspects of the apparatus 10.

Operational parameters for the apparatus 10 which are monitored include the input voltage as represented at line 54; output voltage as represented at line 56; static switch current as represented at line 58; inverter current as represented at line 60; inverter bus voltage as represented at line 62; battery charger current as represented at line 64; and battery charger voltage as represented at line 66.

In general operation, with the sensing of a fault emanating from the utility input the apparatus 10 functions to commutate the static switch 18 and activate the inverter 28 from a stand-by mode to transfer the power flow into the line regulator 22 from the battery source 30 operating through the inverter 28. To assure that the switching components within the static switch 18 are turned off, the static switch current as monitored at line 58 is evaluated in terms of its direction to employ the switching components of inverter 28 themselves to provide commutation. To facilitate this commutation inverter 28 is pre-charged essentially to peak a.c. input at line 12 during its stand-by mode of operation. Once this commutation at static switch 18 is achieved, then the inverter 28 functions to drive the line regulator 22 from the battery source 30. During such operation, the inverter squarewave output will have an amplitude corresponding with the d.c. bus or rail thereof which, in turn, follows the voltage level at battery 30. Detection of the line fault should be relatively swift and, because of the regeneration characteristics of many synthesizers such as the line regulators as at 22, preferably is based upon sensed parameters other than mere voltage. For example, instantaneous phase deviation is detected with the apparatus 10 as one parameter indicating system fault. The apparatus 10 also includes a reacquire circuit wherein, upon return of the utility input at line 12, the power flow is returned to a path through static switch 18. This is achieved through the select control of the firing angle of the SCRs within static switch 18 so as to progressively build the voltage levels at inverter 28 which, looking in a reverse sense into its input via line 42 resembles a synchronous rectifier in view of the anti-parallel diode components of each of its switches.

Figure 2B:
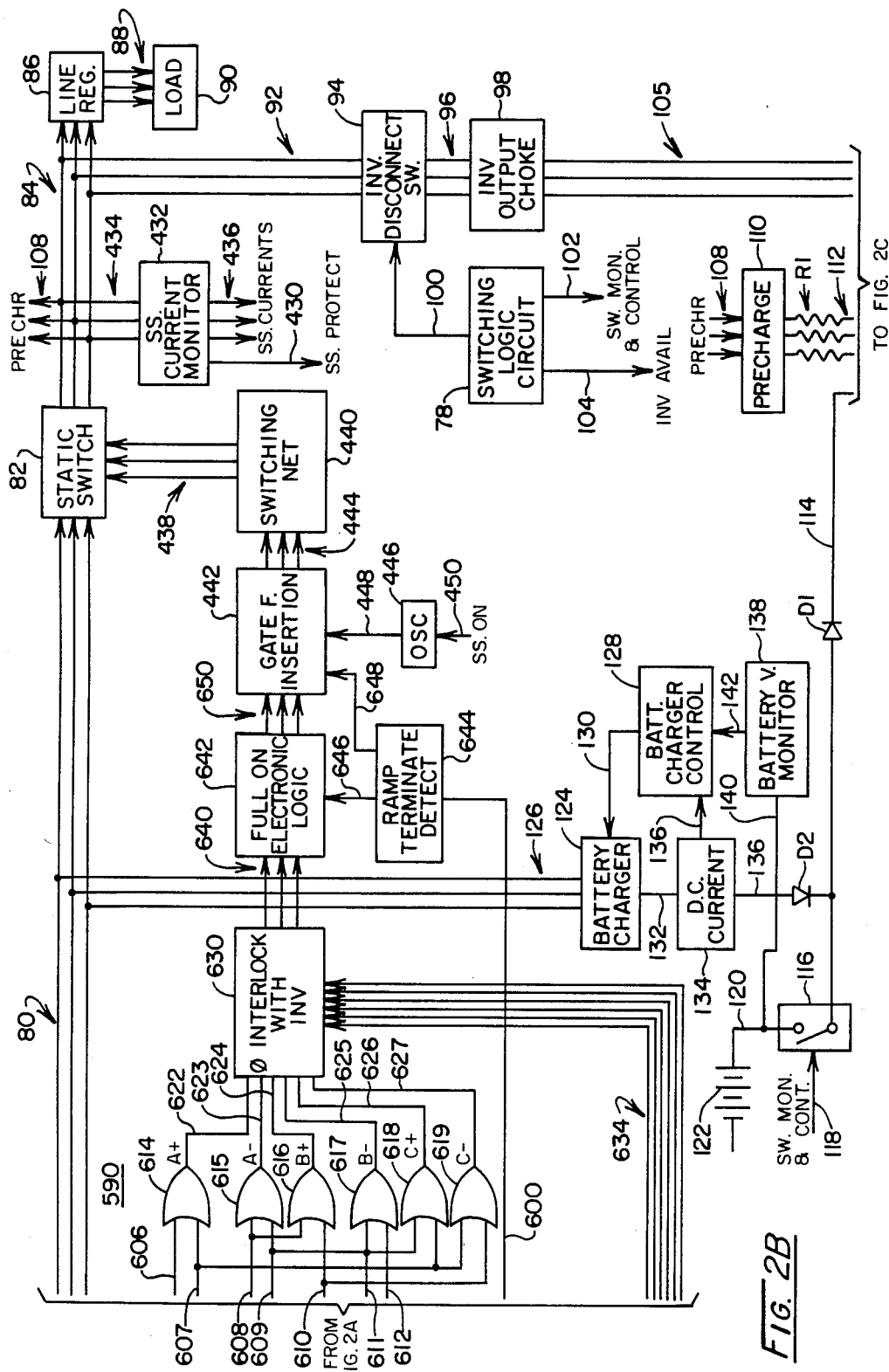
Figure 2C:
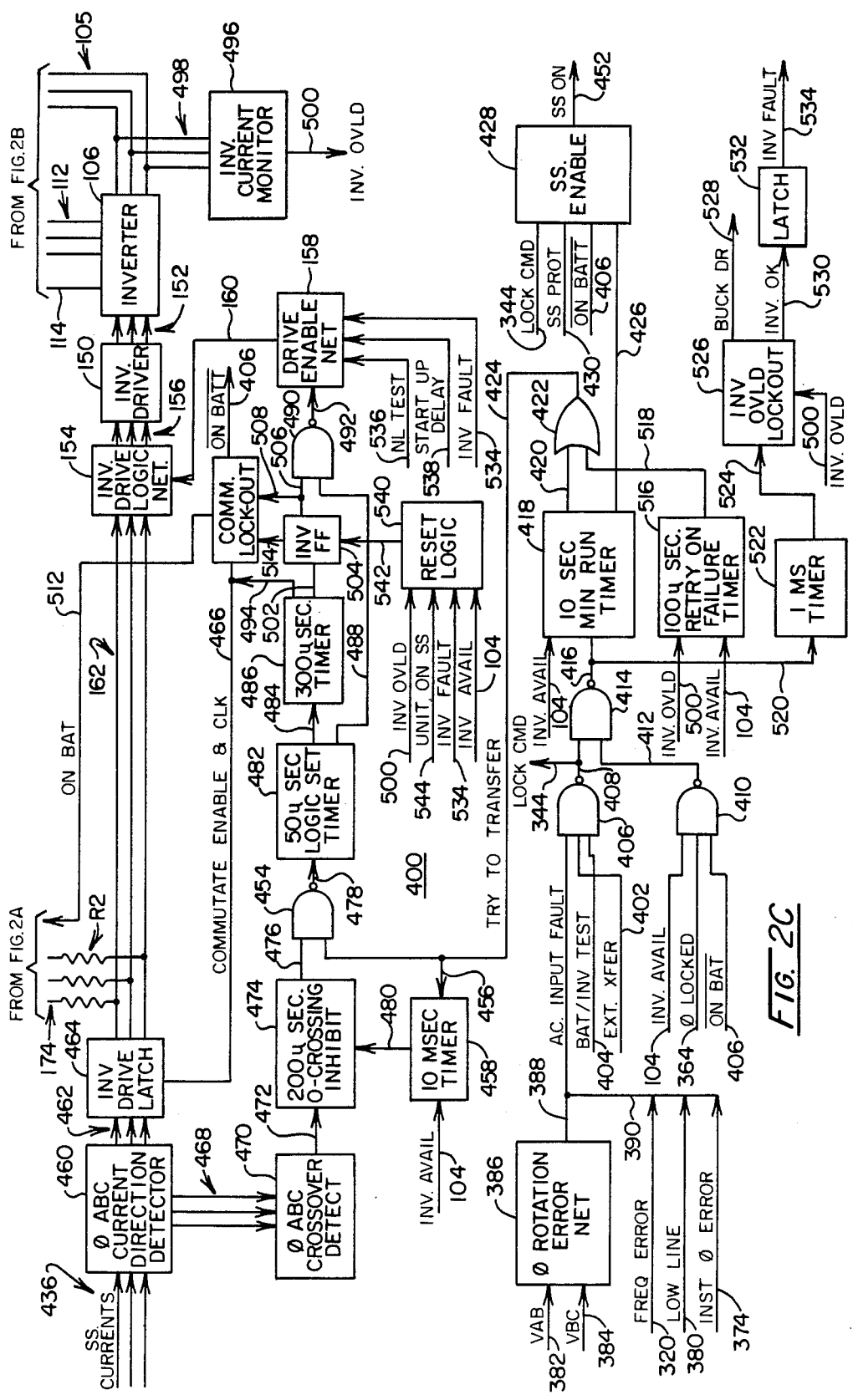

Turning to FIGS. 2A-2C, a more enhanced level of block diagrammatic representation of the apparatus 10 is revealed. These figures should be oriented for the instant discourse in accordance with the inter-associative labelling placed thereon.

Looking to FIG. 2A, a polyphase line input, for example, deriving from the utility is shown as three phases represented at line grouping 72 extending to a main input breaker as represented at block 74. Breaker 74 is manually actuable but under the enablement of the noted under-voltage relay technique the control of which is represented at line 76 emanating from block 78 represented in FIG. 2B. The opposite side of input breaker 74 is represented at line grouping 80 which extends to FIG. 2B and the static switch function as now represented at block 82. Configured as a grouping of two anti-parallel coupled SCRs for each of the three phases shown, the output of static switch 82 is provided at three phase line grouping 84 which, in turn, is directed to a line regulator at block 86 which may be provided, for example, as a voltage synthesizer, motor generator or the like. A resultant synthesized and regulated three-phase output then is provided along three-phase line grouping 88 to a load represented at block 90.

The input to line regulator 86 at line grouping 84 also is addressed by three-phase line grouping 92 which extends, in turn, through the earlier-described inverter disconnect switch represented at block 94, the opposite side of which is coupled by line grouping 96 to one side of an inverter output choke represented at block 98. Disconnect switch 94 is represented as being controlled from the switching logic circuit 78 as represented by line 100, the general monitoring and control output from that circuit 78 also being represented at line 102. As in the case of the main input breaker 74, the logic circuit 78 provides an enabling input at line 100 through applications of over-voltage relay components. This same logic also provides an inverter available (INV AVAIL) signal as represented at line 104 at such time as the logic conditions are appropriate for transfer to the inverter.

The opposite side of inverter output choke 98 is coupled by three-phase line grouping 105 to the inverter shown in FIG. 2C at block 106. Inverter 106 is of somewhat elementary design, inasmuch as it provides no regulation of the output other than supplying a squarewave at the designated frequency of the system. The rails or bus structure of the inverter 106 are charged when it is in a stand-by state to a voltage level selected just slightly higher than the peak voltage supplied from the line source or utility at 72. This pre-charging functions to facilitate transfer of the power flow to the battery-inverter path when necessary. The pre-charge is developed from line grouping 84 in FIG. 2B at line grouping 108 labelled "PRECHR" which, again is seen in that figure leading to a pre-charge circuit represented at block 110. This circuit functions to appropriately adjust the voltage values for the three phases and rectify them for presentation to the inverter rails via line grouping 112 incorporating resistor grouping R1. Also represented schematically as extending to the inverter 106 is the battery charge line 114. Looking additionally to FIG. 2B, line 114 against is shown incorporating the inverter isolation diode function D1, whereupon it is coupled to the battery disconnect switch represented at block 116. Controlled from the switching logic circuit 78, as represented at line 118, the opposite side of switching function 116 is coupled via line 120 to the rechargeable battery or stand-by power source represented at 122. Diode D1 functions to isolate the battery 122 from the inverter 106 during normal or stand-by operation when the bus or rails of the inverter 106 are charged slightly higher than line input peak voltage. Battery 122 is selectively charged by a battery charger represented at block 124 which is powered via line group 126 from input line grouping 80. Charger 124 is controlled from a battery charger control circuit represented at block 128 by an association shown at line 130. The output of the charger 124 is represented at line 132 which, in turn, extends to a d.c. current monitor function represented at block 134, the output of which is employed by control circuit 128 as represented by line 136. Battery charge current extends via line 137 through the battery charger isolation diode function again represented at D2 to be presented at line 114 and thence to switch 116 and battery 122. The voltage at the battery 122 is monitored as an additional form of charger control as represented at block 138 in conjunction with lines 140 and 142.

The inverter 106 switching function is actuated from an inverter driver circuit represented at block 150 via line grouping 152. Driver circuit 150 provides appropriate isolation for the switching function and preferably is that described in U.S. Pat. No. 4,575,668 entitled "Controller for Providing PWM Drive to an A.C. Motor" by R.W. Baker, issued Mar. 11, 1986, assigned in common herewith and incorporated herein by reference. The circuit represented at 150, in turn, is controlled from an inverter drive logic network represented at block 154 through an association represented by three-line grouping 156. Network 154, in turn, is enabled from a drive enable network represented at block 158 through an input signal at line 160. The oscillatory signal input to the inverter drive logic network 154, which ultimately is employed to drive the inverter 106, is developed along three-line grouping 162 and is normally derived from an inverter oscillator performing in conjunction with a phase lock network, the combination being represented in general in FIG. 2A at 164. Looking to the network 164, the oscillatory stage is provided as a voltage controlled oscillator represented at block 166, the output of which at line 168 is directed to a divider network represented at block 170. Network 170 functions to divide the signals at line 168 into discrete A, B, and C phases designated "INV φA REF", "INV φB REF", and INV φC REF" as labeled at line grouping 172. Line grouping 172 extends to corresponding line grouping 174 which, returning to FIG. 2C, is seen to extend to earlier-described line grouping 162 through resistor grouping R2.

Figure 3:
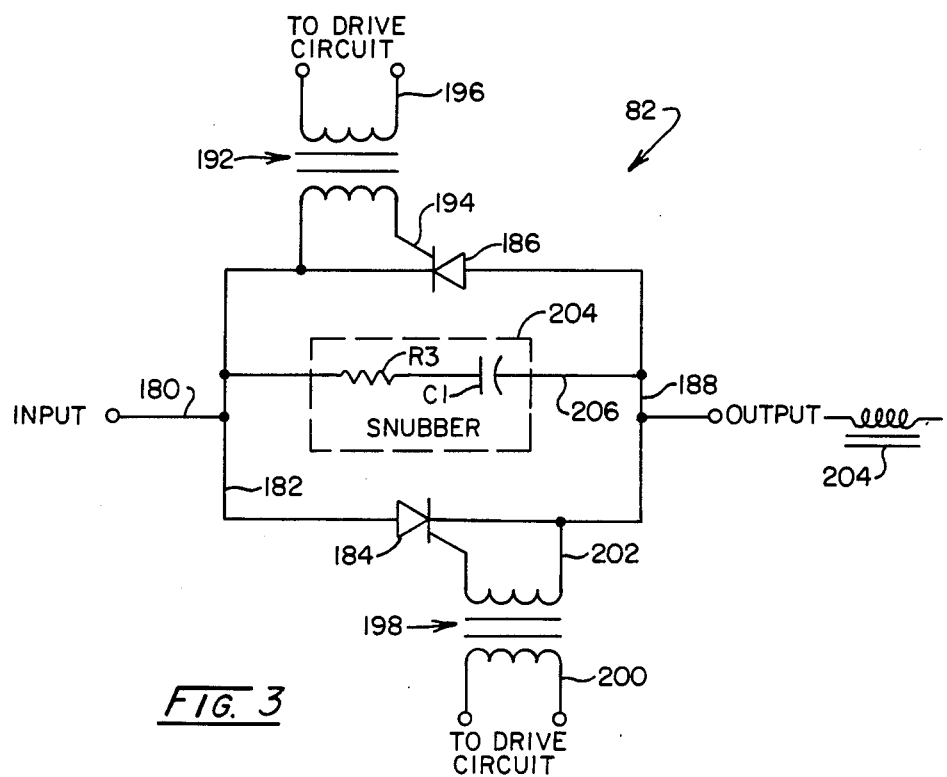
FIG. 3 is a schematic diagram of one phase of a static switch as is employed with the apparatus of the invention.

Turning momentarily to FIG. 3, one phase of the static switch 82 is portrayed. The figure shows one line 180 of line grouping 80 extending to line 182 which, in turn, extends to the respective anode and cathode of SCRs 184 and 186. Correspondingly, line 188 extends from the opposite sides of these SCRs to an output line 190 representing one of the line grouping 84 shown in FIG. 2B. In general, an SCR appears as a diode when in a conducting or on state and appears as an open circuit when off. The devices are enabled to turn on by applying a gating signal of appropriate latching value in combination with the development of an appropriate polarity from their cathode to anode. The gate input to SCR 186 is provided from the secondary side of a pulse transformer 182 as represented at 194. The primary side of the transformer 192 at 196 receives a pulsed input from a drive circuit. In similar fashion, a pulse transformer 198 receives a pulsed input from its primary side 200 which is applied through the secondary side thereof to the gate line 202 of SCR 184. When the static switch is turned on, a high frequency input is continuously supplied to both pulse transformers 192 and 198. The latter pulsed gating approach provides for isolation of the remaining circuit components through the noted transformer arrangement. To turn the SCRs as at 184 and 186 off, the gating signals are removed and current passage through the devices is brought through zero. This can be carried out with natural cycling or through a forced arrangement reversing current flow for an adequate interval. A snubber network is provided with each of the combined SCRs, as is represented at 204. This snubber network includes line 206 extending between lines 182 and 188 and incorporating capacitor C1 and resistor R3. Network 204 provides a voltage limiting function, capacitor C1 isolating the devices from high frequency transients. The devices also are sensitive to dv/dt excursions which are limited by the effect of resistor R3 and capacitor C1 in combination with the inductance of the circuit. This inductance is represented at 204 and is provided, for example, by the inverter output choke 98 and/or the inductance present in the line regulator 86. With the apparatus 10, commutation of the static switch 82 will be seen to be carried out using the inverter 106.

Figure 4:
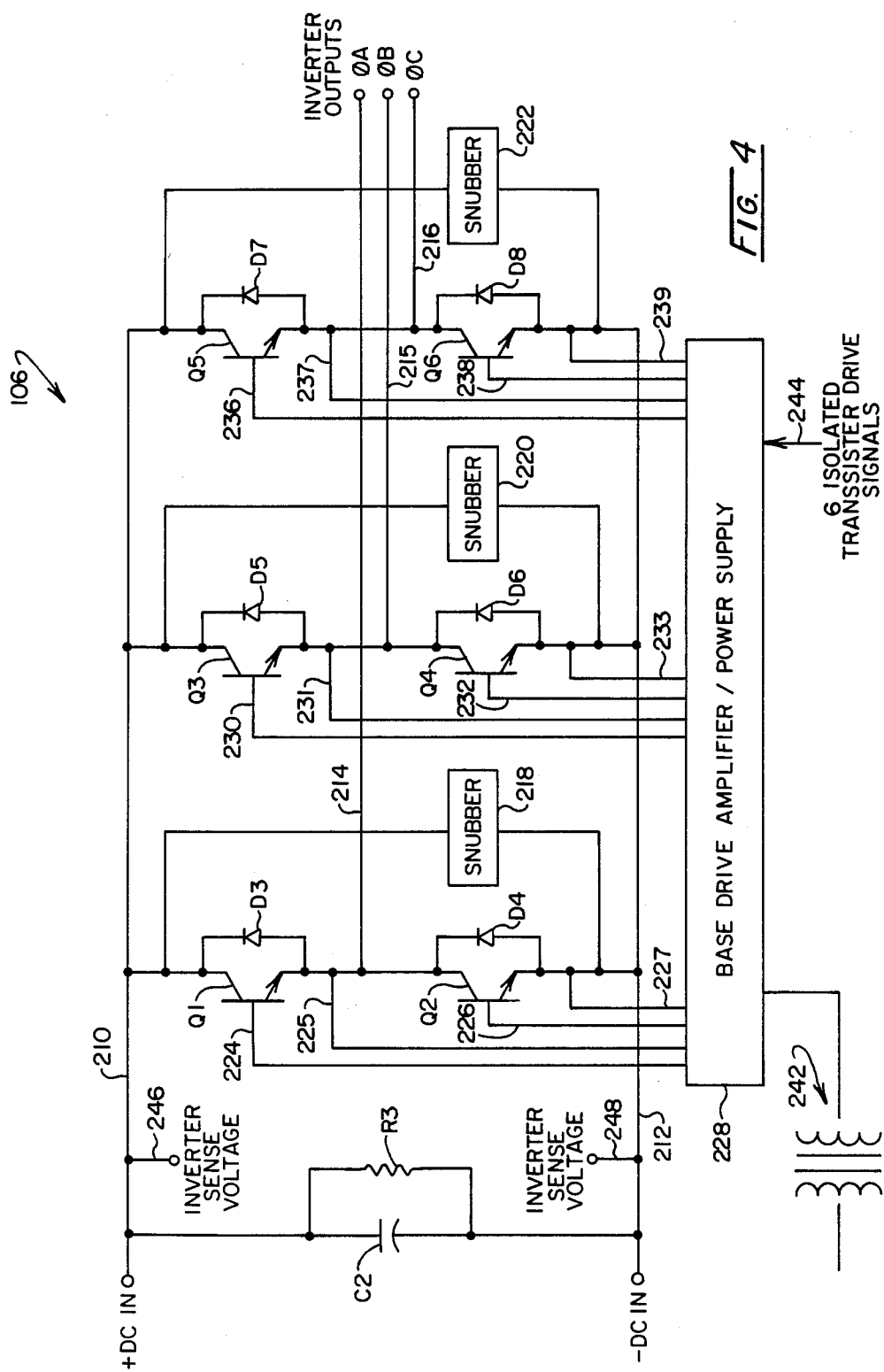
FIG. 4 is a schematic diagram of an inverter which may be employed with the apparatus of the invention.

Looking to FIG. 4, a representation of the inverter 106 is revealed. This inverter may be somewhat simple, inasmuch as it provides no regulation and functions to generate a squarewave which is perfected by the line regulator 86. Inverter 106 incorporates an energy storing d.c. bus or rail arrangement including bus components 210 and 212 across which a capacitor function represented at C2 is provided. Of course, such function generally will be implemented by parallel and series equivalent stacks of the devices. Bus 210 is shown coupled to a +DC IN, while bus 212 is coupled to −DC IN which represents a d.c. common to the entire system. Three pairs of switching components represented as NPN transistors Q1–Q6 are actuated to develop phases A, B, and C for the system at respective lines 214–216. While shown as single transistors, the switching components Q1–Q6 may be, for example, implemented as Darlington transistor pairs and each is shown having an anti-parallel connected diode shown respectively at D3–D8 extending thereacross. Additionally, a snubber network 218 is shown extending across transistor pair Q1–Q2, while a similar snubber network 220 extends across transistor pair Q3–Q4 and snubber network 222 extends across transistor pair Q5 and Q6. These snubbers function to protect the transistors from voltage transients occasioned with parasitic circuit parameters. The transistors themselves typically are mounted on heat sinks and the like, however, the advantageous simplicity of the instant system minimizes heat generation due to switching losses because of the low frequencies involved for the instant switching. To develop an appropriate phase A squarewave at line 214, transistors Q1 and Q2 are selectively forward biased or turned on via lines 224–227 from a base drive amplifier/power supply represented at block 228. Drives to transistors Q1 and Q2 from the base drive function 228 are isolated with respect to each transistor. In similar fashion, transistors Q3 and Q4 are driven from this base drive amplifier function 228 via lines 230–233 while transistors Q5 and Q6 are driven from the function 228 through lines 236–239. The isolated drive into the noted transistor pair is provided from a power transformer incorporating six isolated secondaries as represented schematically at 242 and by six isolated transistor drives represented schematically at line 244. These inputs emanate from an inverter driver as discussed in conjunction with block 154 in FIG. 2C. Note, additionally, that the inverter voltage as represented at buses or rails 210 and 212 is sensed as represented at lines 246 and 248.

The base drive amplifier/power supply represented at block 228 in FIG. 4 requires very high level signals for its operation. As a consequence, the driver network 150 provides these necessary inputs.

Figure 5:
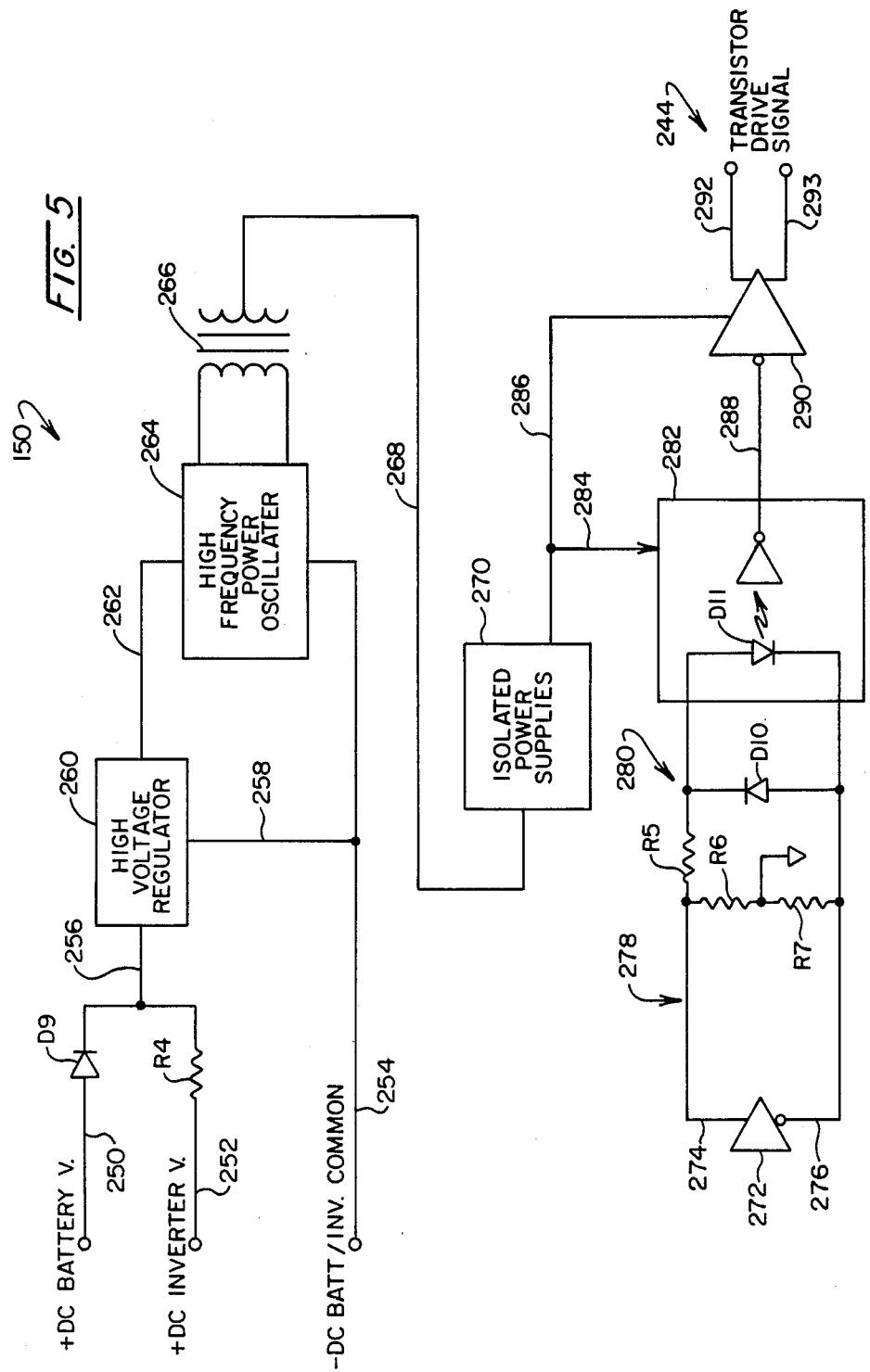
FIG. 5 is a schematic diagram of a drive circuit for use with an inverter employed with the apparatus of the instant invention.

Looking to FIG. 5, one of the six channels of the driver assemblage 150 is revealed in electrical schematic fashion. In the figure, two power sources are shown to be provided, one from +d.c. battery voltage at line 250 which extends through a diode of the isolation diode function shown at D9. Alternately, the positive d.c. inverter voltage may be tapped as represented at line 252 which is directed through a dropping resistor R4. These inputs in addition to the earlier-noted −d.c. battery/inverter common as discussed at line 212 and now represented at line 254 are directed via lines 256 and 258 to a high voltage regulator stage represented at block 260. The regulator 260, as represented at line 262, provides power to a high frequency power oscillator represented at block 264 which additionally is seen to be coupled to the common at line 254. Power oscillator function 264 drives the primary side of an isolation transformer 266, the secondary of which provides the isolated power supply via line 268 and is represented at block 270.

Transistor actuation is developed from the noted oscillator 166 and divider 170 to result in a differential drive output from the drive logic network represented at block 154 in FIG. 2C. One such differential drive output is shown in conjunction with a differential driver component 272 having output lines 274 and 276 which extend along a wire linkage represented at 278 to a termination network 280 comprised of resistors R5-R7 and diode D10 which functions to provide a signal level adjustment suited for driving the light emitting diode (LED) D11 of an opto-coupling network represented at block 282. Powered from isolated power supplies through lines 284 and 286, the coupler 282 provides a drive output at line 288 to a power amplifier 290 which is shown powered from isolated power line 286. The resultant transistor drive signal is provided at line pair 292-293 representing one of the six isolated transistor drive signal inputs discussed in conjunction with line 244 in FIG. 4.

Returning to FIGS. 2A–2C in its general performance, the apparatus of the present invention will react to predetermined defects at the utility or line source input by turning off the static switch 82 and turning on and operating the inverter 106 for the purpose of continuing power from the stand-by source provided as battery 122. In most instances, the line 72 will return as the power source and thus, it becomes necessary to reacquire that input as a source of power and re-establish power flow from the utility or line input at 72 through the static switch 82 while turning off the inverter 106. Thus, monitoring techniques are required to determine when a line defect is occurring and to correct by transfer of power flow path within the very short interval required to sustain proper drive to the load 90. Detecting this default with adequate swiftness requires special consideration where voltage synthesizers and the like are used for line regulation as at 86. These devices are characterized in having an internal energy storage characteristic such that they become regenerative loads. Consequently, the technique of merely sensing voltage level often will be insufficient, the regenerative devices maintaining input voltages for an interval such that the regulator 86 would fall out of regulation at a point in time too late to develop an effective starting of the second power flow through inverter 106. To avoid this error, the apparatus of the invention functions to monitor the phase of the input source and detect instantaneous variations therein as representative of a line source defect. This principal parameter monitor is buttressed with evaluations of line voltage, line frequency and any errors in phase rotation.

Looking to FIG. 2A, it may be observed that the three-phase input line grouping 80 is monitored by a network including line grouping 300 which is tapped at line grouping 302 and submitted to a line-to-line input phase voltage monitoring network represented by block 304. This monitor provides a three logic level output representing the line-to-line voltages from phas A to phase B (VAB); between phases C and B (VCB); and between phases B and C (VBC) at line grouping 306. Additionally, line grouping 300 extends to a line-to-neutral input phase voltage monitor represented at block 308 which develops signals corresponding with a phase-to-neutral condition for phases A, B, and C which are labelled, respectively, VA, VB, and VC which are presented at three-line grouping 310.

The line-to-line signal VBC developed at network 304 and presented at line grouping 306 is tapped by line 312 and directed to a logic compatible squarewave former as represented at block 314. The resultant squarewave then is presented along line 316 to a frequency monitoring network represented at block 318. In the event of a deviation of the line frequency from a predetermined value, for example 60 Hz, a frequency error signal is generated at line 320.

The signal at line 316 also is directed as represented at line 322 to the input of phase lock loop of network 164. In this regard, line 322 is directed to one input of a phase comparator represented at block 324. When enabled by a lock command signal (LOCK CMD) at line 326, the comparator network 324 compares the phase BC reference signal at line 322 with a corresponding inverter phase A reference (INV φA REF) developed by divider network 170 and tapped by line 328. The noted phase BC reference is employed in the instant phase lock loop inasmuch as it is spaced 90° in phase from corresponding phase A. The phase comparator then functions to develop a signal corresponding to any phase deviation between these two inputs and if the phase relationship is appropriate, such output will represent a signal which is 50% of the duty cycle at twice the line frequency. This value is calibrated to avoid vagaries due to power supply driftng and is submitted through a dominant pole stage represented at block 332. The output of stage 332 is directed along line 334 to an augmented integrator stage represented at block 336. Stage 336 provides a portion of its signal on the output immediately and integrates the remainder to develop a control signal at line 338. The integrator is reset by a reset network represented at block 340 and line 342 in response to the removal of the earlier-noted lock command signal, the input of which is represented at line 344. Output line 338 is directed to another dominant pole stage 346 for presentation along line 348 to the earlier-described voltage controlled oscillator 166 which compares the signal at line 348 with a reference signal generated by a reference network represented at block 350 and presented through line 352. A resultant output, as described above, is provided at line 168 as a frequency which is divided at network 170 to develop the inverter phase signals.

The signal representing deviation of phase lock developed from integrator stage 336 is submitted, as represented at line 354, to a phase lock evaluation netowrk represented at block 356. In the event that the synchronization of the phases is within suitable limits, then a corresponding output is provided along line 358 to a delay network represented at block 360. Network 360 functions to render the system immune from oscillation of the phase lock signal and to provide a technique wherein the phase lock indication ($\phi$LOCKED) as represented at line 364 persists for a period long enough to permit the logic to initiate the operation of the inverter 106. Network 362 is enabled by the lock command signal earlier described as represented at line 366 and employs inverter phase c reference of line grouping 172 from line 360.

The output of the phase lock oscillator at line grouping 172, under a phase lock condition, exhibits a form of electrical momentum such that it is somewhat immune from sudden phase deviation which may be experienced at the source input at line grouping 80. Thus, to develop a very fast evaluation of the line, the phase condition of the input line source is compared with the reference phase signal of the phase lock oscillator output to develop instantaneous phase error signal (INST $\phi$ ERROR). This comparison is carried out by a network represented at block 368 which is shown receiving the three-phase oscillator outputs from line grouping 172 at line grouping 370 and the corresponding line-to-neutral output signals of line grouping 310 through coupled line grouping 372. The resutlant instantaneous phase error signal is shown presented at line 374.

FIG. 2A also shows a line defect monitor looking to a low voltage condition. In this regard, a low line detect network is represented at block 376 which functions to monitor the line-to-neutral voltages developed at network 308 as represented at line 378. The resultant a.c. input fault condition (LOW LINE) is shown emanating from line 380.

The line-to-line input voltage monitor network 304 outputs as labelled VAB, VCB and VBC at line grouping 306 are additionally monitored as represented at respective lines 382 and 384 by a phase rotation error network represented by block 386 shown in FIG. 2C.

This phase rotation error is one wherein the A, B, and C phases occur in an incorrect sequence, a condition which may be encountered, for example, due to an improper connection of the input line with the system. In the event that the network 386 does determine an error in phase rotation, then an appropriate fault signal will be developed at output line 388.

Line 388 is seen to be joined in OR logic fashion by signals emanating from line 390 which may carry the earlier-described frequency error signal (FREQ ERROR) from line 320; the low line defect signal as described in conjunction with line 380 or the instantaneous phase error (INST $\phi$ ERROR) described in conjunction with line 374. Any one of these defect signals, as presented at line 388, represents an a.c. input fault representing a condition for transferring the system from powering from the utility or line input at line grouping 72 to a powering thereof from the battery 122-inverter 106 power path. The transfer control circuit for carrying this out is represented generally in FIG. 2C at 400.

In addition to the a.c. input fault which will evoke a transfer condition, an external transfer by the operator may be initiated as represented at line 402, or the battery 122/inverter 106 may be activated in a test mode by appropriate input signal at line 404. These inputs at lines 388, 404 and 402 are commands to the circuit 400 to carry out a power path transfer to inverter operation. They are directed to a NAND function 406 to provide an output at line 408 which represents an incipient command to transfer. Additionally, as represented at line 344 extending from line 408, a lock command (LOCK CMD) signal is developed which is asserted at the oscillator phase lock circuitry 164 as earlier described. This signal becomes false upon the assurance of a line fault.

Three conditions are required for the transfer to be carried out which are set forth at lines 104, 364 and 405 representing, respectively, a signal that the inverter is available; a switching condition described in conjunction with block 78 at FIG. 2B that phase locking is achieved as was discussed in conjunction with circuit 164; and that the unit is not already on battery or, the $\overline{\text{ON BAT}}$ signal is present. These inputs are presented to NAND function 410 for assertion as a condition at line 412. The transfer enabling input at line 412 along with an incipient transfer command at line 408 are asserted at the inputs to NAND function 414 for assertion via line 416 to a 10 second minimum run timing network represented at block 418. The latter network is provided to avoid any oscillatory transfer phenomena in the system, a 10 second run on the inverter being considered minimum for proper performance. Network 418 along with all timers in circuit 400 are reset by an inverter available (INV. AVAIL) signal at line 104 derived from circuit 78. The transfer command, as employed in actuating the timing network at block 418, also is asserted, as represented by line 420, through an OR function 422 to provide a "TRY TO TRANSFER" command signal at line 424. Simultaneously, a signal similar to that at line 420 is asserted via line 426 to a static switch enable network represented at block 428. This network also responds to the presence of a lock command as described in conjunction with line 344 and a static switch condition monitor wherein the signal "SS PROT" represents and overload at static switch 82 and is represented at line 430. Looking momentarily to FIG. 2B, the latter signal line 430 is seen to be derived from a static switch current monitor represented at block 432 which functions to monitor the currents in the static switch 82 at line grouping 84 as represented at line grouping 434. The monitor function 432 additionally functions to derive signals corresponding with the a.c. output currents of the three-phase output of static switch 82 as represented at line grouping 436 and labelled "SS CURRENTS".

The gates of the static switch 82, as discussed in conjunction with FIG. 3 above, are shown activated from a representative line group 438 extending from a switching network represented at block 440. The high frequency switching input which is employed to gate the SCRs of the static switch 82 is inserted from a gate frequency insertion network represented at block 442 via line grouping 444. This oscillator input, which is controlled by the network at block 442, is derived from an oscillator represented at block 446 and the insertion of such signal is represented at line 448. Oscillator 446 is enabled by one of the logic levels of a signal identified as "SS ON" as shown being inserted via line 450 to the oscillator 446. Thus, by removing the input from the gate frequency insertion logic at block 442, gating can be removed from static switch 82 via switching network 440.

Returning to FIG. 2C, the signal for selectively enabling the gating function to the static switch 82 is seen to be derived as the output of the SS ENABLE network 428 as represented at line 452. Thus, as the command to carry out a transfer of power flow path to the inverter is provided to transfer circuit 400, the signal at line 452 indicates that the gating inputs to the static switch 82 are to be terminated.

The transfer signal at line 424 extends both to one input of a NAND gate 454 and via line 456 to a 10 millisecond timer represented at block 458. Timer 458 is reset by the INV. AVAIL signal described in conjunction with line 104. The initial function of this signal at line 424 is to cause a commutation of the switches within static switch 82 by application of commutating current or voltage thereto from he inverter 106. Accordingly, the monitored static switch currents available at line grouping 436 are introduced into a three-phase current direction detector network represented at block 460. The three-phase outputs of this network 460 as are presented at line grouping 462 represent signals for actuating the switches of the inverter 106 in a manner wherein the corresponding SCRs of static switch 82 will be commutated to an off condition. This information, now presented at line grouping 462, is directed to an inverter drive latch represented at block 464, the output of which is coupled to line grouping 162 which, in turn, leads to the control over the switches of inverter 106. Thus, upon receipt of a commutate enable and clocking input from along line 466, the latch 464 will cause the inverter 106 switches to assume an actuated status suited for commutation of the SCRs at static switch 82.

The current direction information made available by network 460 also is employed to determine the presence of a zero crossing at any one of the three phase inputs emanating from line grouping 436. This cross-over detection is provided from line grouping 468 extending from the detector network 460 to a cross-over detection network represented at block 470.

In general, if an error in applying a proper commutation current and voltage is to be encountered with the instant commutation approach, more than likely it will occur close to the zero crossing of any one of the line phases. In the event of an error, then the current otherwise applied to a given static switch SCR would tend to enhance its on state leading to very high current values as opposed to commutating it off. To avoid a decision as to applying a commutation current from the inverter 106, whenever a zero crossing is detected for a given phase at line 470, then that information is communicated as represented by line 472 to a 200 microsecond zero crossing inhibit timing network represented at block 474. The output of this network 474 at line 476 will function to restrain an otherwise enabling output at line 478 of gate 454. In the event that zero crossings are detected in a continuing sequence for an interval of the 10 millisecond time-out developed from network 458, then the inhibiting interval developed at the network at block 474 is terminated via communication represented by line 480.

At the termination of the 200 microsecond time-out at network 474 and the presence of a transfer signal at line 424, the resultant signal at line 478 activates a 50 microsecond logic set timer represented at block 482 to provide a time-out selected for permitting the electronics of the system to become properly set. However, at the initiation of this input at line 478, the network at block 482 as represented at line 484 also effects the commencement of a 300 microsecond time-out by a network represented at block 486. It is during the time-out of the network at block 486 that the circuit 400 will attempt commutation, including a retry attempt in the event of an initial failure in sensing proper commutation current direction. The output of network 482 also is applied as represented at line 488 to one input of NAND gate 490 so as to effect a 50 microsecond disablement of the drive enable network via communication of the output of the gate therewith from line 492. Thus, the 300 microsecond time-out network at block 486 provides an enabling signal at line 494 and earlier-described line 466 which actuates the inverter drive latch 464 to apply switching signals selected to effect commutation to the inverter drive logic network 154. This application occurs for the noted 250 microsecond interval and during that interval takes precedence over the inverter drive inputs otherwise emanating from line grouping 174 and divider network 170 (FIG. 2A). This precedence is assured by the presence of resistor grouping R2.

As commutation is attempted by appropriate actuation of the switches of inverter 106, the current values at the inverter 106 are monitored by an inverter current monitor network represented at block 496 which taps the output of inverter 106 at line grouping 498 and provides an inverter overload (INV OVLD) signal in the event of excessive current as represented at line 500. Where no such overload of the inverter is detected, then the inverter 106 functions to assume the current at the static switch. By virtue of the interaction of the currents at the inverter output choke 98 (FIG. 2B), the inverter output essentially assumes the status of a current source and builds to whatever voltage values are required over the timed interval developed by the network at block 486. To enhance this transfer, it may be recalled that a pre-charge voltage value as developed at block 110 from the output of static switch 82 (FIG. 2B) was impressed upon the inverter 106 buses or d.c. buses or rails during the normal operating period of static switch 82. During this operation the inverter 106 resided in a stand-by status wherein its rails or d.c. buses were at such higher voltage level but no switching activity ensued. If the inverter switch is turned on positive on the positive peak of the line voltage the current will ramp up and once it has achieved load current, the static switch will commutate, i.e. the inverter will have picked up the load current from the regulator. At that point the static switch is reverse biased and the current stops rising in the inverter output choke. It is important that the choke be sized such that there is adequate voltage margin in the inverter to ramp the current in the choke up to the load current before it is necessary to commutate the static switch off.

With a successful commutation by the inverter 106 of the static switch 82 switching elements, the 300 microsecond timer 46 will time-out to present a corresponding signal via line 502 to an inverter flip-flop 504. The resultant signal alteration at line 506 is transmitted via line 508 to a commutation lock-out network represented at block 510. As a result, the commutation enable signal at line 466 is removed to half the current direction signals at inverter drive latch 464 and an "ON BAT" signal is generated at line 512 representing that inverter operation is under way. The inverse of this signal as earlier described is generated at line 406. The commutation lockout network 510 also provides a signal at line 514 to reset the inverter flip-flop represented at block 504 to withhold commutation activity once inverter operation is under way. Once the inverter 106 is operating under the battery 122 power source, the d.c. buses or rails thereof will assume the instantaneous voltage values of battery 122 and the squarewave output at line grouping 104 will have an amplitude corresponding therewith. Because of the performance of line regulator 86 (FIG. 2B) this alteration in voltage amplitude will be corrected along with the development of proper sinusoids prior to presentation of the input to load 90.

In the event, that following an attempted commutation, the inverter current monitor 496 develops an inverter overload signal as at line 500, then that signal will be seen to be applied along with the inverter available condition at line 104 to a 100 microsecond timer represented at block 516. This network responds to the inverter overload input at line 500 to commence a 100 microsecond time-out selected to assure that the system will make a correct determination of static switch current direction upon a second try to commutate. If a wrong decision is made at network 460, the pertinent SCR of static switch 80 is forward biased to cause a commutation fault with currents of off scale levels. The inverter output choke 98 gives some time to react, the inverter being turned off to try commutation again. This is the purpose of the INVERTER FAULT signal into the drive enable network 158. Thus, at the termination of the noted 100 microsecond time-out, a signal is applied through line 518 to gate 422 to develop a transfer signal at line 424 causing the commutation activity to recommence. When the second try occurs 100 microseconds later the current through the SCR should be substantial on the order of hundreds of amperes and the determination of current direction is quite simple.

The signal at line 416, representing an incipient transfer command, also is presented along line 520 to the input of a one millisecond timer represented at block 522. This timing function is selected to terminate all commutation attempts following the noted one millisecond interval. The instantaneous signal status of the timer is presented at line 524 which is directed to the input of an inverter overload lockout network represented at block 526. Network 526 functions to inhibit the inverter overload signal representing an excessive current situation at inverter 106 during the noted one millisecond time interval. The network provides a "BUCK DR" signal at line 528 which functions to prohibit battery charging activities and, additionally, provides an inverter okay output (INV OK) at line 530 which is directed to a latch represented at block 532 which functions to derive an inverter fault signal (INV FAULT) at line 534 following the noted one millisecond time-out. The latter signal may be employed to disable that drive enable network 158. This network 158 also responds to a no load test input signal provided by the operator as represented at line 536 and additionally responds to a start-up delay input represented at line 538.

The inverter fault signal also is submitted to the reset logic network associated with the inverter flip-flop 504 and represented at block 540. It may be observed that this reset logic also responds to the inverter available signal at line 104, the inverter overload logic developed at line 500 and a signal representing that the unit is operating on the static switch 82 as represented at line 544. The latter signal assures that if the system is operating under line power through static switch 82 that no attempts to commutate will be carried out.

Now, considering operation of the apparatus of the invention under conditions where the utility line input at 72 is re-established following a failure, it is desirable that a technique be available wherein the power flow path from the utility line input 72 through the static switch 82 may be reacquired. The conditions extant at this point of time, however, normally militate against such a reacquisition. For example, the inverter 106 has been driving the line regulator 86 with a squarewave having an amplitude well below the peak amplitude of the sinusoid asserted from the line input at 72. A consideration of the simple expedient of locking the two inputs together momentarily would engender rapid changes in power flow with a net power flow into the inverter. Currents involved in such a combination render such an approach to be impractical. The apparatus of the invention maintains system functionality while evolving a gradual transition from one power flow to the other. Additionally, consideration is made as to the condition of the united squarewave and sinusoid as they approach zero cross-over. If the SCR current has not reached zero current cross-over at the time the next inverter switching takes place, the SCR current will persist and reach too high a value due to voltage difference between inverter and utility. The instant apparatus will be seen to delay switching the inverter as the reacquisition procedure ensues.

Figure 6A:
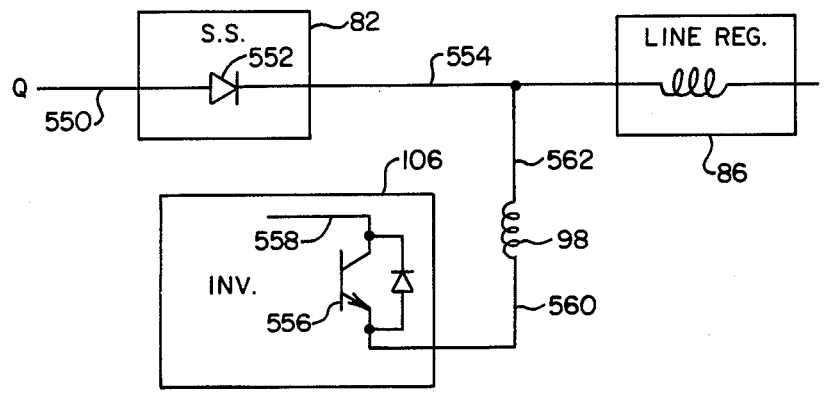
FIG. 6A is a schematic diagram of a phase hypothetically showing a static switch component and an inverter switching component employed in describing a transfer circuit operation according to the invention.

As noted earlier herein, the inverter 106, when considered in terms of its output, appears as rectifier bridge when the transistor switching components thereof are not activated. When they are so activated, the device appears somewhat as a synchronous rectifier bridge. Through the activity of the inverter output choke 98 and through an approach wherein a graduated firing circuit arrangement is used to gate the SCRs of the static switch 82, the rails or d.c. bus components of the inverter 106 can be brought to the line input 72 sinusoid peak voltage levels and an effective reacquisition of the primary power flow path of the apparatus 10 can be achieved. Because the apparatus 10 operates in a line-to-line mode, a single phase representation of the reacquisition procedure is not entirely accurate, however, a consideration of the technique using a single phase approach may be of some tutorial value. Looking to FIG. 6A, a fictional phase "Q" is shown as a single line input 550 to one SCR 552 of a static switch, again represented within block 82. The output of the SCR at line 554 is directed to the line regulator 86 and ultimately to load 90. Similarly, the inverter 106 is represented with a singular and corresponding transistor stage 556 shown having its collector coupled with the positive bus or rail 558 of the inverter system and its emitter connected via line 560 to one side of the inverter output choke 98, the opposite side of which is coupled by line 562 to line 554. Note that a diode is coupled in anti-parallel relationship across the emitter and collector of transistor stage 556.

Figure 6B:
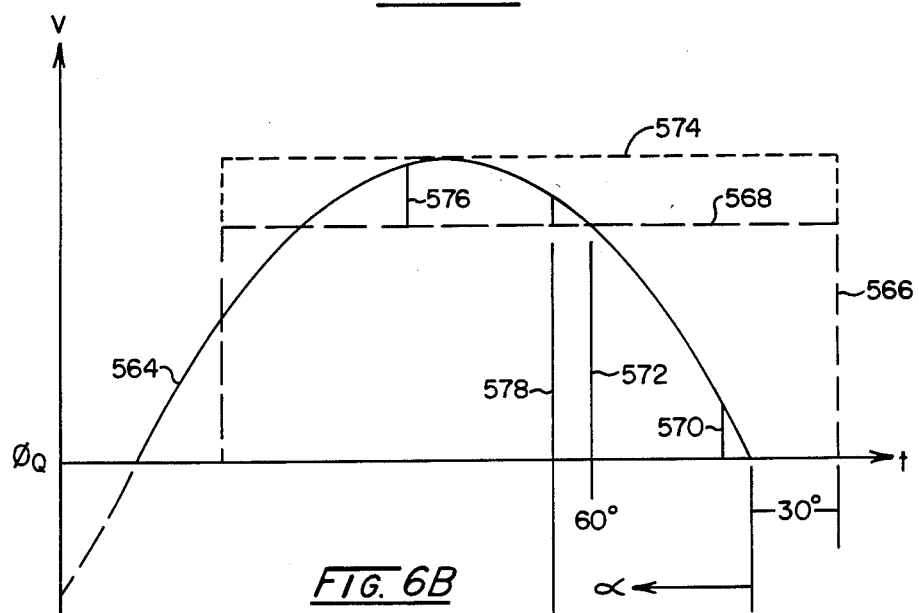
FIGS. 6B and 6C are curves relating voltage and time as well as currents for the hypothetical phase described in conjunction with FIG. 6A.

Now turning to FIG. 6B, the performance of this phase "Q" for a positive going half cycle of both the inverter squarewave as developed at line 560 and the line input sinusoid as presented at line 550 are revealed. Plotted in terms of voltage versus time, the figure shows a half cycle for the incoming sinusoid at 564 and the initial squarewave output at line 560 of the inverter 106 as comprising components 566 and lower battery determined amplitude shown by dashed line 568. To avoid a condition wherein the zero cross-over conditions for both the sinusoid and squarewave coincide, the squarewave at the time of reacquisition is not synchronized precisely with the sinusoid by the phase lock-oscillator network 164 (FIG. 2A) but is lagged by about 30° as labelled in the figure. Thus there is no coincidence of these cross-over positions. Next, the SCR 552 is gated into conduction on a graduated basis as represented by the phase control angle, $\alpha$. As this phase control angle is commenced, it may be fired, for example, at location 570, a condition wherein the voltage of the inverter is greater than the voltage on the phase Q such that the SCR 552 is back biased and will not conduct current. As that phase angle, $\alpha$, increases to, for example, 60° as represented by line 572 the line voltage amplitude and the inverter voltage amplitude become comparable. Thus, as the phase control firing angle is increased, current will commence to flow in the SCR 552. This will represent power supplied by the utility to the lead. However, inasmuch as there is an inductor 98 in the system, such current will not increase instantaneously. This increasing of the phase control or firing angle for each succeeding cycle continues until enough voltage becomes available such that all the load power is being supplied by the utility and the inverter ceases to supply any power. Because of the regenerative diode within the transistor 556 of the inverter 106, the d.c. components and charging capacitors will commence to be charged on a gradual basis to a level just below the peak line amplitude. Accordingly, should the SCR 552 be turned fully on, a sudden surge of current will not occur through the inverter otherwise functioning to bring the inverter d.c. bus or rail to peak values. As the firing angle is increased, the resultant amplitude of the inverter output at line 560 theoretically approaches the peak of curve 564, a more practical value being represented at dashed horizontal line 574. Generally, the static switch is turned fully on and the inverter is disabled at some point beyond the peak of the sinusoid input as represented, for example, at line 576.

Figure 6C:
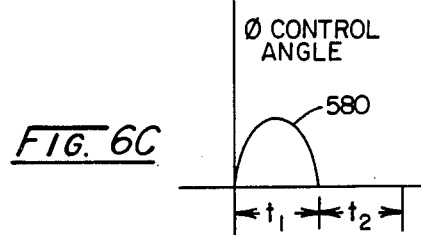

FIG. 6C shows the currents developed in conjunction with the firing of the SCR, for example at line 578 in FIG. 6B. This current, represented by the curve 580 occurs over a time interval, $t_1$, whereupon the SCR is commutated off by the line voltage decreasing below the inverter d.c. voltage. Following the condition time $t_1$, there is a time that assures that the SCR is fully turned off before the next voltage transition of the inverter occurs. This time ($t_2$) is augmented by the 30° phase shift. Thus, the initial lagging, for example by 30°, of the inverter synchronization is provided by control at phase lock-oscillator circuit 164.

Returning to FIGS. 2A and 2B, the reacquire circuit is represented generally at 590. This circuit develops the graduated firing angle for the SCRs of the static switch 82 through the use of a ramp signal developed by a ramp generator network represented at block 592. The resultant ramp signal is presented to a ramp-phase comparator network represented at block 594 via lines 596 and 598. The ramp generator additionally provides a phase control ($\phi$ CONTROL) signal at line 600 which is employed to check the noted 30° lag in synchronization of the inverter output with the utility input at 72. This control signal 600 is seen being directed to the dominant pole stage 332 of the phase lock loop. Thus, during the occurrence of a ramp signal generated at network 592, the noted 30° lag signal is applied to circuit 164. The ramp itself is relatively slow, for example operating at a voltage build-up of about 5 volts per second such that the ramp occurs for about two seconds to provide a good control rate. This ramp is compared against the phases or components of the phases which are developed from the line-to-line inputs at line groupings 306 as well as the analyzed individual phase inputs at line grouping 310. ADditionally, adjustment or minor offset voltage values are employed by the system as represented at lines 602 and 604 labelled, respectively, "VDM" and "VDP". The logic for developing the appropriate ramp-phase intercept signals involves an initial isolation of positive and negative going signal combinations at output lines 606-612 which are seen to carry the phase information indicated. As shown in FIG. 2B, these combined signals then are grouped at NOR gates 614-619 to provide phase related outputs as labelled for providing time progressive firing signals at respective lines 622-628. To assure that the firing signals for the SCRs are substantially coordinated with the inverter switching signals, an interlock network represented at block 630 is provided. However, to assure an avoidance of dv/dt transients, the interlock 630 is provided with a squarewave representing inverter operation which is altered in pulse width with respect to the corresponding squarewaves directed to the inverter drive logic network 154 from line grouping 174. The technique is one of deriving non-overlapping squarewaves through the use of a generator network for that purpose as represented at block 632. In this regard, line grouping 174 is directed to the network at block 632 to provide the altered corresponding squarewave output at line grouping 634 which is directed, in turn, to the interlock network at block 630.

Figure 7:
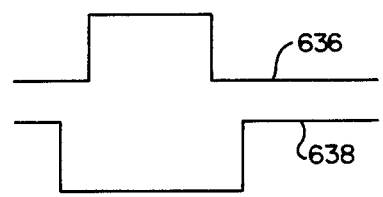
FIG. 7 is a representation of non-overlapping squarewaves as are generated by the apparatus of the instant invention.

Turning momentarily to FIG. 7, the non-overlapping squarewaves are exemplified, the waveshape at 636 representing those entering the generator network 632 from line 174, while the waveform 638 representing those directed to the interlock network 630. By so providing the non-overlapping feature of these waves, assurance is made that the inverter switching will not coincide with sinusoid zero cross-over occurrences.

The output of the interlock network 630 is represented at line grouping 640 as being directed to a full on electronic logic network represented at block 642. This network 642 functions to turn on the gating input to the SCRs in conjunction with a termination of the ramp generation. Accordingly, the phase control signal at line 600 from the ramp generator network at block 592 is monitored by a ramp terminate detect network represented at block 644 which provides a terminate detect input to the full on network at block 642 as represented at line 646. This same signal is provided via line 648 to the gate frequency insertion network 442 as earlier described. The full on logic signals are presented to the latter network via line grouping 650.

Figure 8E:
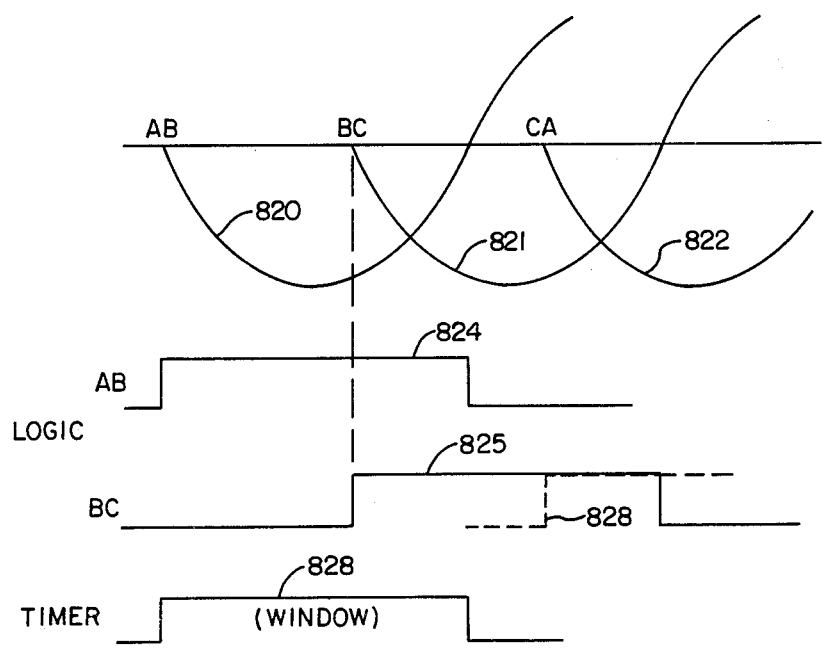
FIG. 8E shows a combination of hypothetical curves employed to describe the operation of a phase rotation error detection circuit.
Figure 8B:
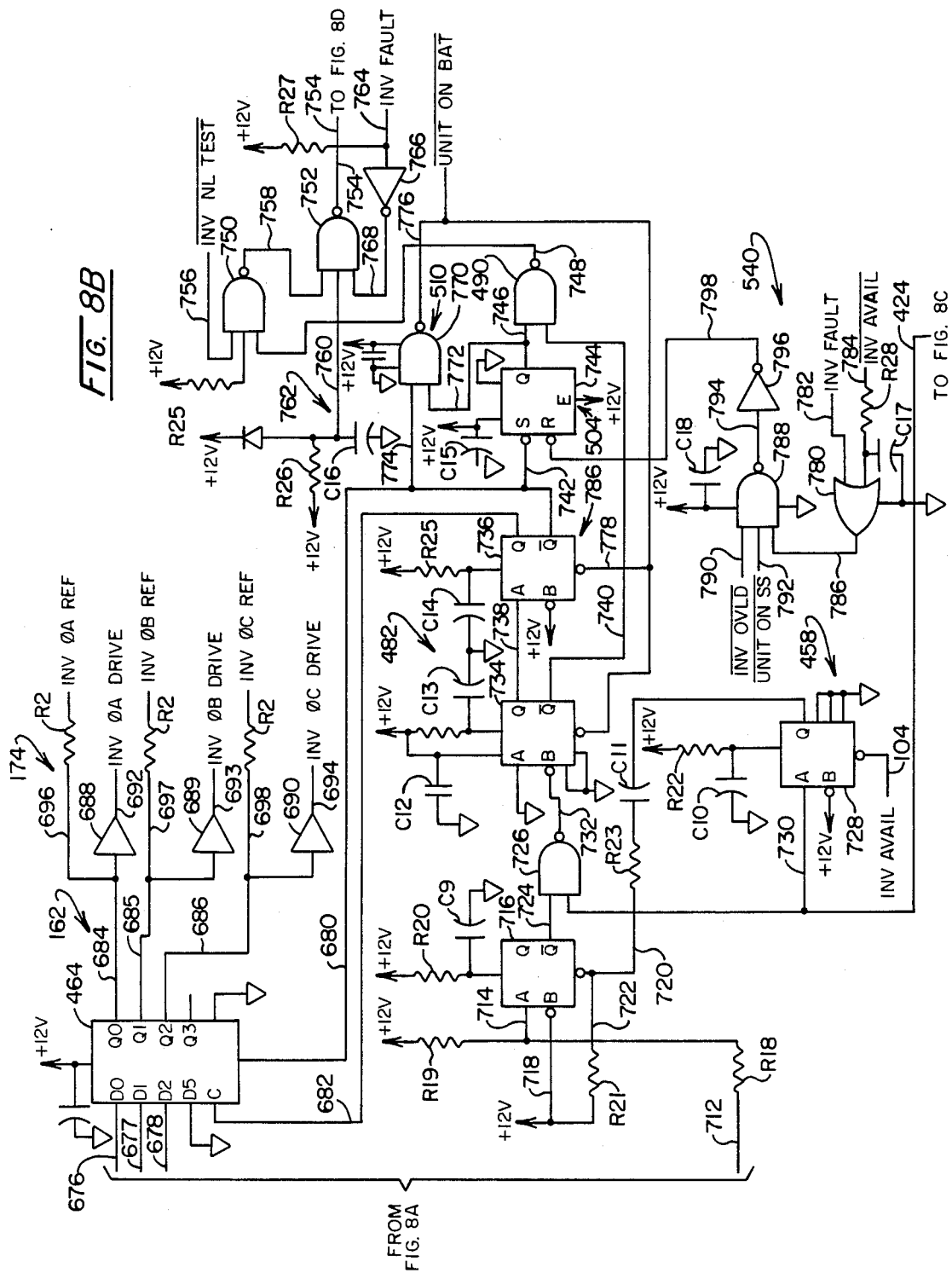
Figure 8C:
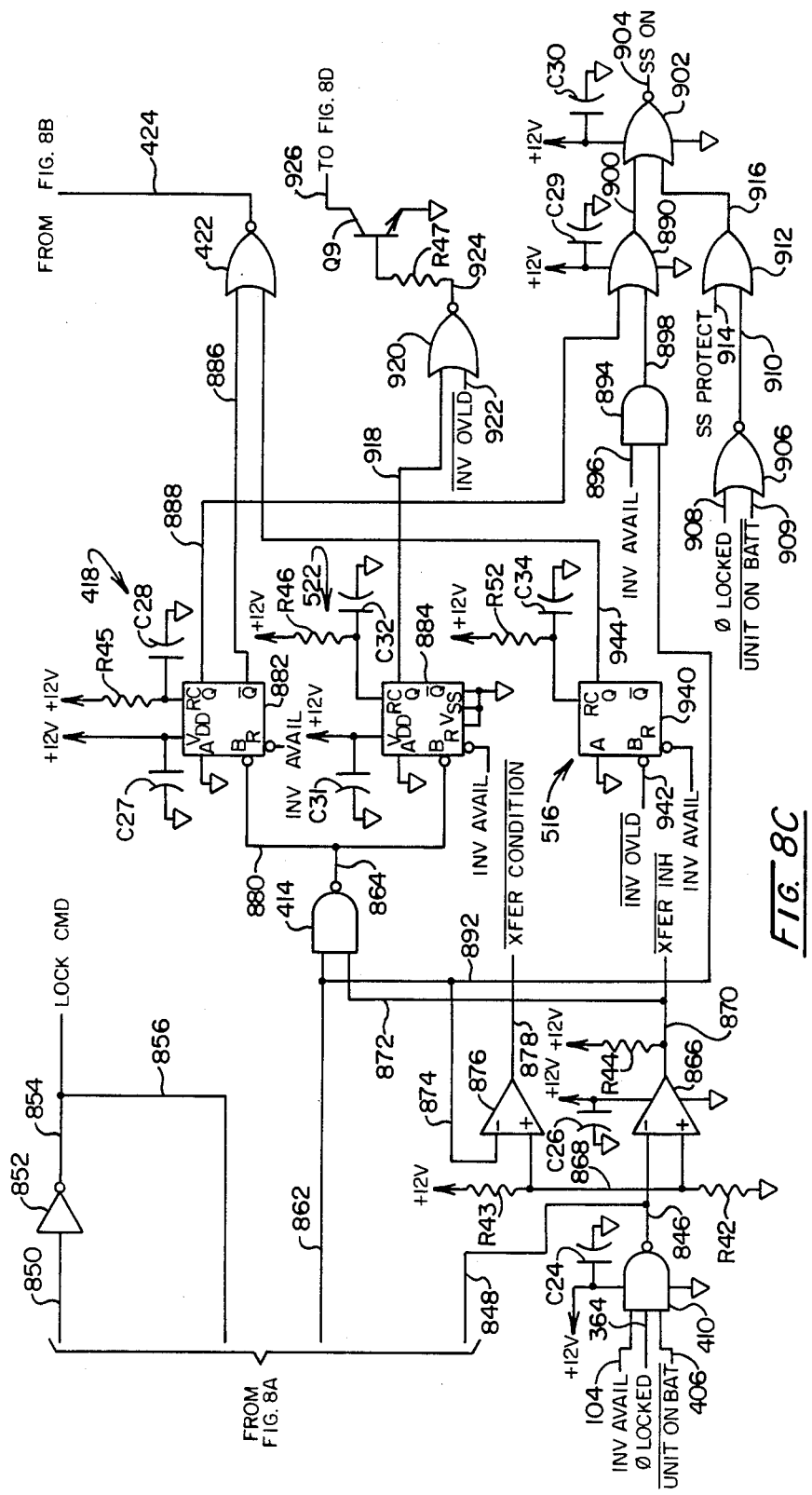

Turning to FIGS. 8A-8C, transfer circuit 400 is depicted at an enhanced level of detail. These figures should be considered in the orientations assigned by their interlabelling. Where appropriate, numeration is retained from FIGS. 2A-2C in the interest of clarity.

Looking to FIG. 8A, the analog values of the monitored static switch currents as described earlier in conjunction with line grouping 436 are shown being applied to lines 660-662 with respect to the three phases involved. Accordingly, these lines are respectively labelled "AC IN $\phi$A", "AC IN $\phi$B", and "AC IN $\phi$C". The inputs are directed to the positive input terminals of comparator stages 664-666. Stages 664-666 are identically structured, each having an input resistor R10 and a feedback resistor R11 along with filtering capacitors as at C4. The feedback arrangement including resistors R11 provides a hysteresis form of performance and the comparators are seen to be powered from both +12 v and −12 v along with appropriate filtering as shown at capacitors C5 and C6 in conjunction with stage 664 only. The negative input terminals for the stages 664 and 666 are each coupled to analog ground and the open collector outputs thereof at respective lines 668-670 are seen to be directed through level shifting network including resistors R12 and R13 as shown coupled with +12 v such that a "zero" or logic high +12 v voltage signal will provide an indication of the direction of current. The resultant signals are filtered by capacitors as at C7 and submitted to buffer components shown respectively at 672-674. From these buffers, the resultant output at respective lines 676-678 are directed to the corresponding D0-D2 inputs of a type 4076 latch, again represented at block 464 and shown in FIG. 8B. Latch 464 is enabled or disabled via line 680 and the resultant current directional data latched therein is clocked to the output terminals Q0-Q2 from line 682 to provide static switch outputs at respective lines 684-686. The latter lines are buffered at respective buffer components 688-690 to provide inverter drive signals at respective lines 692-694 labelled, respectively, "INV $\phi$A DRIVE", "INV $\phi$B DRIVE", and "INV $\phi$C DRIVE". Also applied to lines 684-686 through resistor grouping R2 and respective lines 696-698 of earlier-described line grouping 174 are the phases A, B, and C reference signals from the oscillator-phase lock loop combination described in conjunction with FIG. 2A at 164. Because of the resistors R2, the circuit 400 will give precedence to the commutation activities for the earlier-noted time intervals of commutation.

Returning to FIG. 8A, the zero crossing detect network again is represented at 468 as comprising coupling capacitors C8, one of each of which is incorporated in lines 700-702 extending from respective output lines 676-678. The capacitors C8 feed cross-coupled diodes D15 and D16 for each phase, the cathode sides of diodes D15 being commonly coupled via line 704 and 706 to one input of a comparator 708, while the corresponding anodes of diodes D16 are connected via lines 700, 702, 708 and 710 to the opposite side of comparator 708. Line 708 is coupled to +12 v through pull-up resistor R14, while line 704 is seen coupled to −12 v through resistor R15. Line 708 is shown coupled to ground through resistor R16, while, in similar fashion, line 706 is coupled to ground through resistor R17. These resistors function to provide a form of pulse differentiation such that a positive-going pulse is generated at output line 712 on the occurrence of any zero cross-over experienced at the sinusoid input at line grouping 436.

Looking again to FIG. 8B, those pulses representing a zero crossing occurring at line 712 are seen to be directed through line 712 containing resistor R18 and line 714 to the A input of a monostable multi-vibrator 716 which, by component selection of resistor R20 and capacitor C9, provides a 200 microsecond time-out which, as described in conjunction with block 474 in FIG. 2C provides a waiting interval, inasmuch as a static switch current direction determination may be in error where the pertinent sinusoid is near a zero crossing. Line 712 additionally is seen to be coupled through pull-up resistor R19 to +12 v. Additionally, it may be noted that the B terminal of device 716 is coupled to +12 v via line 718, while the reset terminal thereof is connected by lines 720 and 722 to +12 v. The $\overline{Q}$ output of device 716 occurs at line 724 which, in turn, is coupled to one input of NAND gate 726. The opposite input to gate 724 is earlier described line 424 (FIG. 2C) which, in effect, is a command to attempt to transfer the power flow to the inverter-battery stand-by system as well as commutate the static switch to an off condition.

The signal at line 424 also triggers a monostable multi-vibrator 728 via line 730. Device 778 performs the 10 millisecond timing function described at block 458 in FIG. 2C and its time-out period is developed from capacitor C10 and resistor R22 coupled therewith. The device is enabled from the inverter available signal developed from the switching logic circuit 78 at line 104 (FIG. 2B) and functions to provide a signal at line 720 through capacitor C11 and resistor R23 which disables the output at line 724 from device 716 following a noted 10 millisecond interval.

NAND gate 726 functions to inhibit the transfer signal from line 424 in the presence of the noted 200 microsecond time-out at device 716. Where the 200 microsecond time-out does not occur or has timed out, then the signal from line 424 appears at output line 732 as a high to logic low transition which functions to activate a 50 microsecond timer earlier described at block 482 and shown constituted as a monostable multi-vibrator 734. The 50 microsecond timing for device 734 is established by coupled resistor R24 and capacitor C13. Triggering of device 734 effects a simultaneous triggering of a next adjacent monostable multi-vibrator 736 via line 738. Device 736 provides a 200 microsecond time-out by virtue of the selection of values for coupled capacitor C14 and resistor R25. A corresponding disabling signal is provided from device 734 via line 740 to one input of NAND gate 490 which will be seen to function to inhibit performance of the inverter for the earlier-noted logic interval. However, the Q output of device 736 immediately clocks the current direction data from line 676-678 to the output of latch 464 by signal at line 682 and this information simultaneously is presented at the output lines 684-686 thereof by virtue of the corresponding but inverted signal at line 680. As a consequence of the earlier-noted 50 microsecond logic set interval developed from device 734, the period of commutation attempt by the circuit 400 becomes 250 microseconds. In effect for that interval, the control over the inverter 106 is effected from latch 464.

The 300 microsecond time-out from device 736, as represented by the signal at line 682, also is asserted via line 742 to the S terminal of an inverter flip-flop earlier described at block 504 and shown herein at 744. Coupled to +12 v and capacitor C15, the flip-flop Q output is provided at line 746 which is, in turn, coupled to the opposite input of NAND gate 490. Accordingly at the termination of the 50 microsecond time-out from device 734 at line 740, gate 490 permits the signal at line 746 to be passed to its output at line 748 for propagation through NAND gates 750 and 752. The output from latter gate 752 at line 754 functions to enable the inverter drive circuits described in conjunction with block 154 in FIG. 2C. A servicing enabling input may be provided at line 756 to gate 750 for carrying out inverter no-load testing. A second input to the gate 750 is shown coupled to +12 v through pull-up resistor R25 and the output of the gate may be observed to be directed via line 758 to one input of gate 752. A second enabling input to the latter gate is provided from line 760 which extends to a power-up delay network 762 comprised of diode D12, resistor R26 and capacitor C16. The third input to gate 752 is from line 764 which is coupled through resistor R27 to +12 v as well as to the input of an inverting buffer 766, the output of which extends via line 768 to gate 752. Line 764 carries the inverter fault signal to disable the inverter drive upon the occasion of some given inverter fault condition. It may be recalled that this signal is derived from a logic combination described in conjunction with FIG. 2C at blocks 526 and 532.

The commutation lock-out function described in conjunction with block 510 in FIG. 2C is implemented with NAND gate 770, one input of which is developed from line 772 which conveys the signal from the inverter flip-flop 744. The opposite input to the gate is derived from lines 680 and 774 which carry the commutation signal. When the commutation signal has terminated and the inverter flip-flop 744 is on, the output of gate 770 at line 776 becomes logically true. The result is a unit on battery signal (UNIT ON BAT) which functions to reset the 50 microsecond timer device 734 and to reset the 300 microsecond timer 736 via line 778. The noted "UNIT ON BAT" signal serves the additional function of prevent recommutation once the commutation has been carried out. It may be recalled in this regard that the signal is collectively impressed at line 406 to gate 410 as described in conjunction with FIG. 2C.

The reset function described in conjunction with block 540 in FIG. 2C is seen in the instant figure to be comprised of OR gate 780, the input to which receives the inverter fault signal from line 782 or the inverter not available input signal as derived from switching logic circuit 78 (FIG. 2B) as applied through resistor R28 in line 784 and filtered by a capacitor C17. The output of gate 780 at line 786 is directed to one input of NAND gate 788 which also is seen to receive the inverse of the inverter overload signal from line 790 and the inverse of the unit on static switch signal at line 792. Coupled to +12 v and filtered by capacitor C18, the gate 788 output at line 794 is buffered and inverted at inverter 796 for presentation along line 798 to the rest input of the inverter flip-flop 744. Thus with the noted combinative logic, the commutation system is reset.

Returning to FIG. 8A, the phase rotation monitoring network discussed in conjunction with FIG. 2C at block 386 is represented generally by that numeral. The network 386 taps the line-to-line voltage signal $V_{AB}$ as well as a corresponding line-to-line signal $V_{BC}$ as shown inputted from respective lines 382 and 384. These signals were described in conjunction with FIG. 2A and block 304. The $V_{AB}$ signal at line 382 is directed to one input of a type 339 comparator 800 coupled to + and −12 v in conjunction with filtering capacitors C19 and C20. The opposite input to comparator 800 is derived from a reference network incorporating resistors R21–R32 and capacitor C21 coupled to +12 v and output line 804 of device 800. The arrangement develops a squarewave input at line 806 to the A input of a one-shot multi-vibrator 808.

In similar fashion, line 384, carrying the $V_{BC}$ line-to-line signal is directed to one input of type 339 comparator 810, the opposite side of whic is provided as a reference network represented generally at 812 and comprised of resistors R33–R36 in combination with capacitor C22 coupled to +12 v and incorporating output line 814. The resultant squarewave output at line 816 is shown being directed to the C input of a D latch or flip-flop 818. Additionally, the D terminal input to this latch receives the Q output from device 808. The resultant operation is represented schematically in FIG. 8E. Looking to that figure, the line-to-line phases AB, BC and CA are represented respectively at lines 820–822. The squarewave generated at line 806 for the $V_{AB}$ input is represented at curve 824 and is seen to be coincident in terms of cross-over positions with the line-to-line signal AB. Similarly, the squarewave representation for the line-to-line sinusoid BC and presented at line 816 is represented in FIG. 8E as curve 825. Dashed line 226 shows the coincidence of the commencement of the squarewave at 825 with the cross-over position for sinusoid BC or curve 821. As the squarewave 824 is presented to terminal A of device 808, a timing window occurs as represented by curve 828. The duration of this timing window 828 is selected such that the next phase in sequence or BC must occur within the time-out or window 828. If that is not the case, for example as represented by phase CA shown in dashed fashion at 828, the an error in phase rotation has been detected. Returning to FIG. 8A, this error condition will be manifested as a logic low signal at output line 830 from device 818. This signal is presented to the input of NOR gate 832, the output of which is filtered at resistor R37 and capacitor C23 for presentation along line 834 to one input of NOR gate 836. The opposite input to gate 36 as well as to gate 832 is derived from lines 838, 840 and earlier-described line 380 carrying a low line signal as derived from low line detect network 376 described in FIG. 2A. Line 840 is shown coupled to +12 v through a resistor R40. The output of gate 836 at line 842, if low, will represent either a low lying condition or an improper phase rotation and is directed to one input of NAND gate 844. A second input to gate 844 is provided as a frequency error inverted signal as discussed in conjunction with block 318 in FIG. 2A. The instantaneous phase error signal as developed at line 374 and discussed in conjunction with block 368 in FIG. 2A again is shown at line 374 being directed to one input of OR gate 844, the output of which at line 846 forms the third input to gate 844.

Looking momentarily to FIG. 8C, NAND gate 410 as described in conjunction with FIG. 2C again is reproduced as responding to the inverter-available signal, the phased locked signal and the inverse of the unit on battery signal as described earlier in conjunction with respective lines 104, 364, and 405. The gate is shown coupled to +12 v and filtered by capacitor C24 to provide an output at line 846 which is tapped by line 848 for presentation as the second input to OR gate 844. Treatment of the so-asserted signal is provided by a network coupled to line 848 comprised of resistor R41, capacitor C25, and diode D31 coupled to +12 v as shown in FIG. 8A. The latter figure further shows the output of gate 844 at line 850 to extend to FIG. 8C whereupon it is buffered and inverted at buffer 852 for assertion at line 854 as a "lock command" (LOCK CMD) signal. This signal, the absence of which functions to disable the phase lock loop, is tapped by line 856 and, returning to FIG. 8A, is asserted as an a.c. input fault to one input of earlier-described NAND gate 406 reproduced in FIG. 8A. Gate 406 further may receive an input represent a battery inverter test for servicing purposes and the like via line 858 or an external transfer command from line 860. Returning to FIG. 8C, the output of gate 406 at line 862 is directed to one input of earlier-described (FIG. 2C) NAND gate 414, the output of which is provided at line 864.

The opposite input to gate 414 is derived from the output line 846 of gate 410 which represents conditions which may inhibit the transfer to a power path including the inverter 106. In this regard, line 846 is directed to one input of a comparator which performs as a buffer and is shown having its opposite input coupled with line 868 incorporating resistors R42 and R43 and coupled between +12 v and ground. The output of stage 866 at line 870 provides a transfer inhibit not signal (XFER INH) which is asserted via line 872 to the second input of gate 414. A pull-up resistor R44 is coupled between line 870 and +12 v. Thus, until the conditions asserted at gate 410 are satisfied, no transfer can be carried out and a transfer inhibit condition exists. The signal at line 872 additionally is asserted via line 874 to a corresponding comparator stage 876 which, serving as a buffer, provides a logic reversed transfer condition mode signal (XFER CONDITIONCONDITION/ ) at line 878.

The output of gate 414 at line 864 is coupled by line 880 to the B input of a monostable multi-vibrator 882 as well as to the corresponding B terminal of another such device at 884. One shot device 882 is configured in conjunction with capacitor C28 and resistor R45 to provide a 10 second time-out which represents the minimum time upon which the system employs the power path through inverter 106. The input signal at line 880 is essentially immediately recognized at line 886 to be asserted at NOR gate 422 to provide an attempt to transfer signal at line 424. The Q terminal of device 882 additionally asserts a signal along line 888 to one input of OR gate 890 which is shown coupled to +12 v and which is provided with filtering capacitor C29. The opposite input to gate 890 derives from line 892 which is coupled to line 862 carrying a transfer command signal. Line 892 extends to one input of AND gate 894, the opposite input to which at line 896 carries the inverter available (INV AVAIL) signal. Line 898, the output of gate 894, provides the opposite input to OR gate 890 and the output of the latter gate at line 900 is seen to be directed to one input of NOR gate 902. The output of gate 902 at line 904 represents the logic for removing or applying gate pulses to the SCRs of the static switch 82 and is designated "SS ON" as described in conjunction with line 450 and oscillator 446 in FIG. 2B. Device 902 is coupled to +12 v supply which is filtered by capacitor C30. The opposite input to gate 902 is derived from NOR gate 906 which receives the phase lock condition as well as the unit on battery mode condition from respective lines 908 and 909 to provide a corresponding output at line 910 which is directed to OR gate 912. The opposite input to gate 912 may carry the static switch protect signal (SS PROTECT) at line 914. It may be recalled that this signal represents an overload or like condition for static switch 82 is derived from the static switch current monitoring function described in conjunction at block 432 in FIG. 2B. The output of gate 912 is coupled to the second input of gate 902 via line 916.

Monostable multi-vibrator 884 is configured by capacitor C32 as well as resistor R46 to provide an output at its Q terminal and line 918 at the end of a one millisecond time-out. This one millisecond is selected as the interval during which attempts to retry commutation after an initial failure may be carried out. Because the failure will be detected by an inverter overload signal, for this one millisecond interval the inverter overload signal is suppressed. Line 918 is seen being directed to one input of a NOR gate 920, the opposite input thereto being the logic false complement of the inverter overload (INV OVLD) signal at line 922. The output of gate 920 is present at line 924 which extends through base resistor R47 to the base of NPN transistor Q9, the emitter of which is coupled to ground and the collector of which is coupled to line 926. Looking additionally to FIG. 8D, line 926 is seen to extend to line 928 which, in turn, is coupled through resistor R48 to +12 v. With the arrangement, lines 926 and 928 retain a logic high representing the signal "INV OK". At the termination of the noted one millisecond interval, however, the transistor Q9 is forward biased to derive an inverted signal or logic low at lines 926 and 928.

Line 928 additionally is coupled to the collector of NPN transistor Q10 via line 930, the emitter of which is coupled to ground. The base of transistor Q10 is coupled to a level shifting network represented generally at 932 and comprised of diodes D32-D35, resistors R49-R51, and capacitor C33. One input to the network 932 is provided at line 934, while the other is provided at line 936. These lines extend to the earlier-described switching logic circuit 78 (FIG. 2B) and, while normally at ground, will revert to an open circuit condition in the event the switching logic circuit 78 indicates that the inverter 106 is not in proper condition for operation. As a consequence, transistor Q10 will be forward biased and thus bring line 928 to a logic low value to remove the "INV OK" signal. As described in conjunction with FIG. 2C, the "INV OK" signal is latched by a latch represented at block 532 and, following the one millisecond time-out wherein the inverter overload signal is locked out, and in the event of an inverter overload, then the "INV FAULT" signal as described in conjunction with line 534 of the latter figure is activated. Such signal will terminate communication attempts. Also shown in FIG. 8B is line 938 which is coupled through diode D36 to line 928. Carrying a signal labelled "BUCK DRIVE", the line 938 functions to disable the battery charging control as described in conjunction with block 128 in FIG. 2B upon the occasion of the termination of commutation attempts or inverter operation.

Returning to FIG. 8C, a third monostable multivibrator 940 provides another time-out operation as developed from associated resistor R52 and capacitor C34. This timing function, as described earlier in conjunction with block 516 in FIG. 2C, responds to an inverter overload signal or condition at its input line 942 to provide a 100 microsecond time-out at the termination of which a commutation signal is developed at its Q output line 944. Line 944 extends to NOR gate 422 to provide a retry signal for commutation. Assuming that an incorrect decision as to the commutation signal current direction has been made, then following the noted 100 microsecond period and the inverter overload condition detecting the improper decision, a retry at commutation is made. Such retry should be successful, inasmuch as the current at this juncture will be readily distinguished in terms of its direction for asserting a commutation signal. It may be observed that each of the timing devices 882, 884 and 940 are reset by the inverter available signal (INV. AVAIL).

Figure 8D:
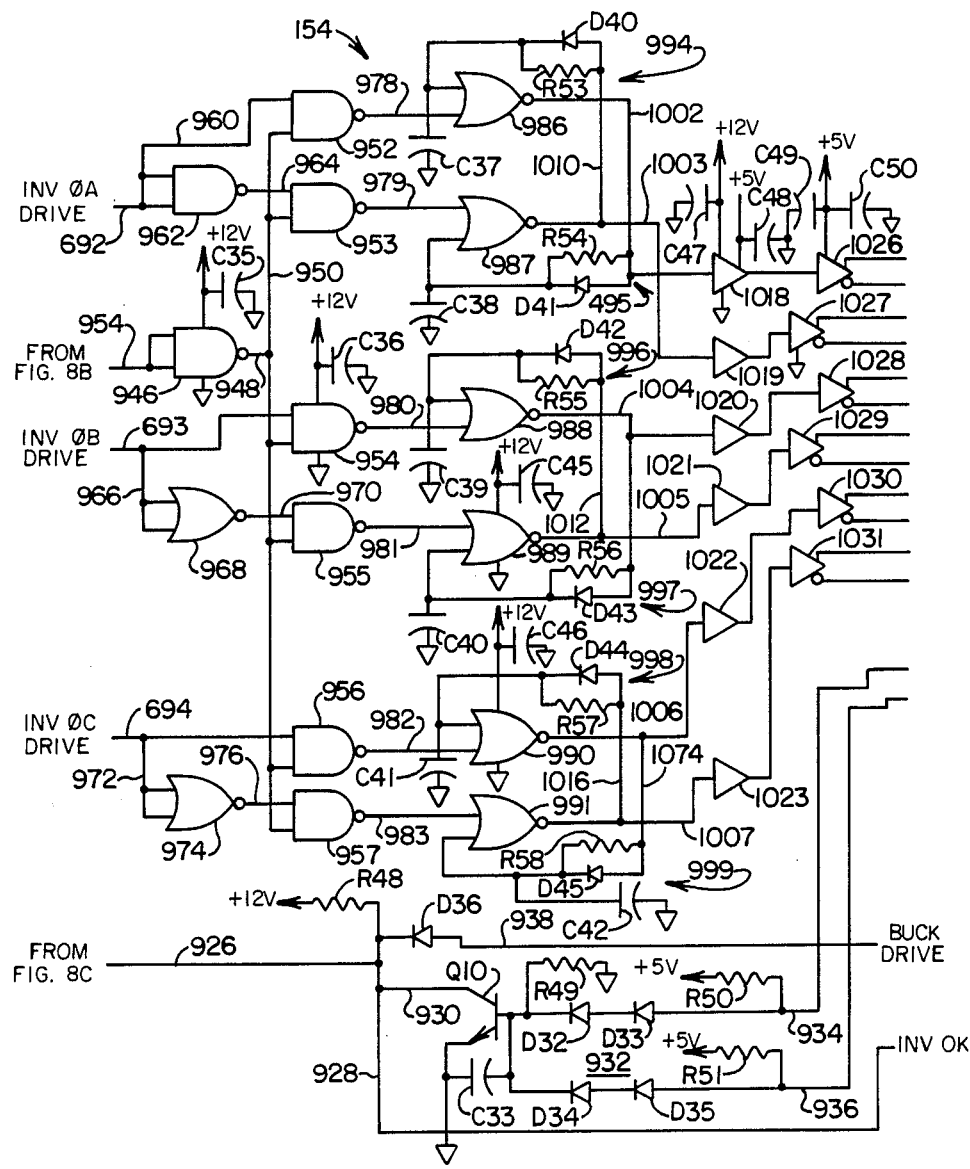

Turning to FIG. 8D, the components forming the inverter drive logic network described in conjunction with block 154 in FIG. 2C are set forth at an enhanced level of detail. The network, again shown generally at 154, is enabled as described above by a signal emanating from line 754 (FIG. 8B) which is applied through an inverting stage implemented by a NAND gate 946 shown coupled to a +12 v power supply as filtered by capacitor C35. The inverted output of gate 946 at line 948 is distributed within network 154 from line 950 to one input of six NAND gates 952–957. The opposite inputs to these gates is derived from the three phase designated inverter drive signals described in FIG. 8B in conjunction with lines 692, 693 and 694. The phase A drive signal at line 692 is seen to extend through line 960 to the opposite input of gate 952, while the same signal is inverted at NAND gate 962 and submitted via line 964 to the second input to gate 953. Similarly, the phase B drive at line 693 is seen coupled to the second input of gate 954, while this signal then is inverted via line 966 and NOR gate 968 to provide a signal to gate 955 via line 970. Finally, phase C drive to line 964 is seen coupled to the opposite input of gate 956, while the same signal is inverted via line 972 and NOR gate 974 to provide the corresponding input from line 976 to gate 957. The outputs of NAND gates 952–957 are shown, respectively, at lines 978–983. These outputs are directed to one input of NOR gate grouping 986–991. The opposite inputs to these gates 986–991 are derived from respective RC networks 994–999. These networks function to assure that a dead band or interval of about 60 microseconds exists between the turning on of a positive switching device and the turning off of a negative switching device and vice versa in the inverter 106. The networks 994–999 are identically structured and formed of capacitors C37–C42 operating in conjunction with resistors R53–R58 and diodes D40–D45. These networks are seen to be associated between the output of one polarity drive for a given phase and the input of the opposite polarity. For example, the outputs of gates 986–991 are provided at respective lines 1002–1007. Exemplary of the arrangement, line 1002 of gate 986 extends to RC network 995 which, in turn, extends to the second input of gate 987. Correspondingly, the output of gate 987 at line 1003 extends via line 1010 to the input of gate 986. In similar fashion, the output at line 1004 of gate 988 extends through network 997 to the input of gate 989, while the output of the latter gate at line 1005 extends via line 1012 to the input of gate 988. Similarly, the output of gate 990 extends via lines 1006 and 1014 to network 999, in turn extending to the input of gate 991, while the output of the latter gate at line 1007 extends via line 1016 to one input of gate 990. Note that gates 989 and 990 are coupled to +12 v supply and are filtered by respective capacitors C45 and C46.

Looking to gates 986 and 987 as exemplary in the event output line 1003 of gate 987 is high to turn on the negative device of phase A of the inverter 106 then the capacitor C37 of network 994 is charged through diode D40. As a consequence, the input from network 994 to gate 986 is a logic high and no output at line 1002 is possible. However, when line 1003 assumes a logic low value representing a switch off condition, then capacitor C37 is permitted to discharge through resistor R53 over the noted 60 microsecond interval. At the termination of that interval the gate 986 is made capable of asserting a logic high switching level at its output line 1002. The same mutually restrictive conditions exist for all of the gate pairs of the netwokr.

The outputs of gates 986–991 are directed to respective level shifting buffers 1018–1023, the corresponding respective outputs of which, in turn, are submitted to the inputs of respective differential drivers 1026–1031. These drivers serve the same function as the differential driver described at 272 above in connection with FIG. 5 for providing input an opto-coupler.

Power is supplied to the level shifting devices and to differential drivers from +12 v and +5 v as filtered by capacitor grouping C47–C50.

As described in FIG. 2A in conjunction with blocks 304 and 308, the line a.c. input is monitored and analog representations of line-to-line input voltage for each phase are developed and line-to-neutral values also are derived. Looking to FIG. 9, the treatment of the line-to-line a.c. input voltages is revealed as described in conjunction with block 304. In this regard, the input signals are identified as: AC IN VAB", "AC IN VBC", and "AC IN VCA" which are, respectively, directed to lines 1034–1036. The signal are treated by the resistor-capacitor combination shown at R60–R62 and C52–C54. The resultant outputs are the earlier-labelled VAB, VBC and VCA. Line 1035 is tapped by line 1038 and the signal is presented therefrom through resistor R63 to one input of comparator 1040. A capacitor C55 is coupled to analog ground additionally from that input. The opposite input to the comparator is the above derived signal VBC at line 1042. The resultant output represented through resistor R64 which, in turn, is coupled to pull-up resistor R65 to +12 v to provide the logic compatible squarewave forming function described in conjunction with block 314 in FIG. 2A and presented at line 316 as the phase BC reference employed by the phase lock loop.

Referred to FIG. 10, the treatment of the line-to-neutral phase as described in conjunction with block 308 is set forth. In this regard, the line-to-neutral input voltages for phases A, B and C are shown inputted at respective lines 1044–1046 which are introduced through the combination of resistors R66–R68 and capacitors C56–C58 to provide the analog monitoring voltages VA, VB, and VC.

Figure 11B:
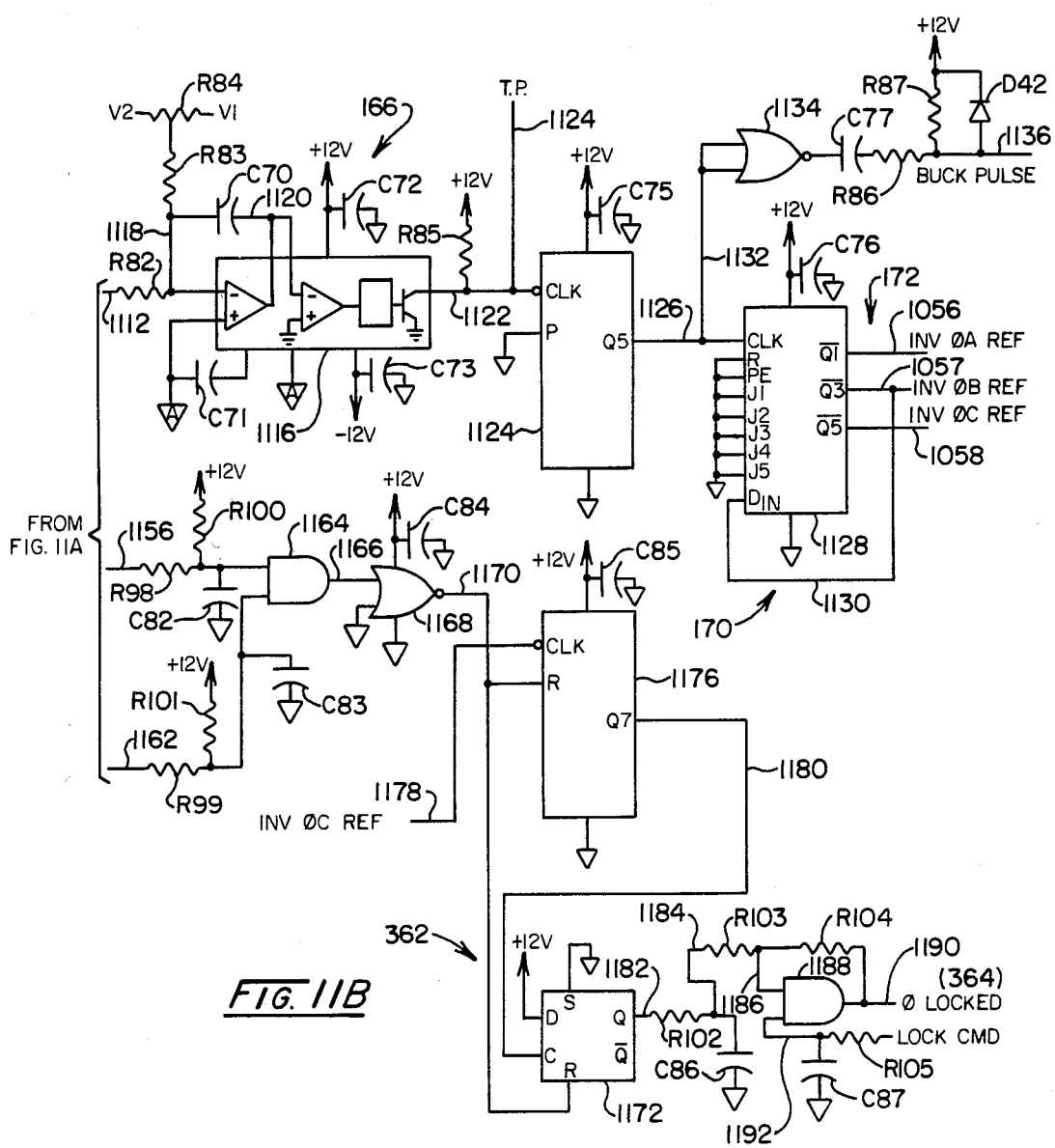

Referring to FIG. 11A, the oscillator-phase lock loop circuitry described at 164 in conjunction with FIG. 2A is revealed at an enhanced level of detail. This circuit employs the phase BC reference described in conjunction with FIG. 10 which is applied via lines 316 and 1048 to one input of an AND gate 1050. The opposite input to gate 1050 is the lock command earlier described in conjunction with line 854 and FIG. 8C. The ANDing function at gate 1050 serves to terminate any phase lock requirement in the event to a line fault. The output of gate 1050 at line 1052 is directed to an exclusive OR gate 1054 which serves the comparator function for the phase lock loop as described at 324 in FIG. 2A. In this regard, the gate receives an inverter phase A reference signal from along line 1056. It may be observed that the inverter phase A or feedback reference, if in phase synchronization with the line, will be cyclically 90° separated from the phase BC reference of line 316. Accordingly, the output of gate 1054 at line 1060 when synchronization is achieved will be a 50% duty cycle signal at twice the line frequency. To provide a calibrated value immune from voltage excursion, this output is submitted to a type HI201 analog switch represented at 1062 shown coupled between +12 v and −12 v in conjunction with filtering capacitor C59 and C60. The output of switch 1062 at line 1064 is coupled with a calibrated voltage source V1 developed at line 1066 which is shown extending to this source through resistors R69 and R70.

Looking momentarily to FIG. 11D, the derivation of this stabilized source V1 of +10v as well as stabilized sources V2 and V3 at respective values of −10v and +10v is revealed. The power supply input (R) is shown at line 1068 to which a filtering capacitor C63 is attached. This line extends to one input of a voltage reference integrated circuit 1070 the output of which at line 1072 is filtered at capacitor C64 and is shown extending to the input of a buffer amplifier 1074 coupled between +12 v and −12 v supply as filtered by respective capacitors C65 and C66. The output of the amplifier 1074 at line 1076 is fed back to the negative input thereof via line 1078. Line 1078, in turn, is seen directed to the negative input terminal of another buffer amplifier 1080 through input resistor R71. The output of the amplifier at line 1082 is fed back to the noted input via line 1084 and resistor R72, while the positive terminal of the amplifier is coupled to analog ground. The result is the development of the noted stabilized voltage source V2 at line 1082. In similar fashion, line 1072 is tapped by line 1086 which is directed to the positive input of buffer amplifier 1088 to provide an output at line 1090 which is fed back via line 1092 to the negative input terminal and which provides the stable source labelled V3. Returning to FIG. 11A, the analog switch 1062 is operated from line 1060 such that when line 1060 is at a logic low the signal is grounded at line 1064 such that it is effectively zero volts. However, when the input at line 1060 is at a logic high, the signal at line 1064 reverts to the V1 reference value to provide a squarewave which is well defined and which transitions from ground to 10 v. The resultant signal at line 1066 is filtered by operational amplifier 1094. In this regard, line 1066 is shown extending to line 1096 through resistor R73, line 1096 extending to the inverting input of device 1094. A filtering function is achieved in conjunction with resitor R75 coupled with stable source V2 and resistor R76 as well as capacitor C65 within the feedback path designated generally at 1098 extending from output line 1100. Diode groupings D40 and D41 provide rate limiting over the excursion of the output of amplifier 1094, while the device is seen coupled to + and −12 v in conjunction with filtering capacitors C66 and C67. The arrangement represented generally at 332 is typically referred to as a "dominant pole stage" of a phase lock loop. To provide the noted 30° lag for the reacquisition circuit 590 the phase control signal is applied at line 600 as labelled to insert a resistor R76w into the path 1098. A feedback network 1098 is coupled by line 1102 through resistor R76 at R77 through the inverting input of an operational amplifier 1104 which is configured as an augmented integrator. In this regard, its output at line 1104 is coupled in feedback fashion to its in put through capacitor C68 and resistor R78 and the device functions to put a portion of the signal applied thereto at its output 1104 immediately and functions to drive the error of the phase lock loop to zero. Because this integration stage requires resetting or zeroing out due to drift characteristics, an analog switch 1106 is incorporated within its feedback path output to respond to the lock command (LOCK CMD) signal and carry out a resetting of the stage 340. The augmented integrator stage shown generally at 340 is followed via line 1108 carrying resistor R79 to the inverting input of an operational amplifier 1110 forming a second dominant pole stage represented generally at 346. In this regard, the output of amplifier 1110 is provided at line 1112. A feedback path shown generally at 1114 is seen to incorporate capacitor C69 and resistors R80 and R81 the latter being coupled to stable source V2. Line 112 is seen being directed through resistor R82 to one input of a voltage controlled oscillator 1116. Provided, for example, as a type VFC32XP marketed by Burr Brown, Inc. the device is filtered by capacitors C71–C73 and is provided an initial adjustment by the potentiometer structure including resistor R84 coupled between stable sources V1 and V2 and a wiper arm including resistor R83 extending to lines 1118 and 1120, the latter incorporating a capacitor C70. The oscillator 1116 is adjusted by observing the test point at line 1124 to provide some multiple, for example 192, of the line frequency, i.e. 60 Hz. This, for example, will provide a frequency output of 11,520 Hz which may be divided down to develop three distinct phases. Accordingly, line 1122 is introduced to the clock input of a type 4040 counter 1124 coupled to +12 v along with a filtering capacitor C75. Providing a dividing function, the Q5 output of counter 1124 is tapped at line 1126 to provide a signal thereat representing a division by 32 and to provide six times nominal frequency signal. Line 1126 extends to the clock input of a type 4018 counter 1128 which is tapped at its Q1, Q3 and Q5 outputs by earlier-described respective lines 1056–1058 to provide the inverter phase A, B and C reference signals as labelled. These lines were described in conjunction with FIG. 2A at line grouping 172. Device 1128 is coupled to +12 v in conjunction with filtering capacitor C76.

Line 1126 is tapped by line 1132 for purposes of developing a frequency signal used in the battery charging device described in conjunction with block 124 in FIG. 2B. This signal is inverted at NOR gate 1134 and coupled to the charger via capacitor C77 and resistor R86. A pull-up resistor R87 extends to +12 v in conjunction with parallel coupled diode D42 to present the "BUCK PULSE" signal used for the battery charger regulator function at line 1136.

Returning to FIG. 11A, the output of dominant pole stage 332 at line 1100 is seen to extend through resistor R88 to operational amplifier 1138 having a feedback path 1140 extending from its output line 1142 which incorporates filtering components including capacitor C78 and resistor R89. Output line 1142 is tapped by line 1144 incorporating resistor R90 and extending to the inverting input of another operational amplifier 1146. Amplifier 1146 provides an output at line 1148 of reverse polarity with respect to line 1142 which is filtered by a feedback path 1150 including resistor R91 and capacitor C79.

Line 1142 extends to one input of a comparator 1152, the opposite, reference input to which is provided from stable source V1 in conjunction with resistor network 1154 incorporating resistors R92-R94. Device 1152 is coupled to +12 v supply as filtered by capacitor C80. The output at line 1156 will represent a condition of signal 1142 being above the threshold developed at comparator 1152. In similar fashion, the opposed polarity signal at line 1148 is directed to the input of comparator 1158, the opposite reference input to which is derived from stable source V1 in conjunction with a resistor network 1160 including resistors R95-R97. Comparator 1158 is powered from −12 v source as filtered by capacitor C81 to provide an output at line 1162 representing the relationship of the signal at line 1148 to the reference. In the latter regard, when the phase lock loop is in a condition wherein synchronization is achieved between line voltage and the inverter oscillatory output, then the signal at line 1100 will be close or at a zero level. The signals at lines 1156 and 1162 will determine whether or not the signals fall within an appropriate acceptable range representing a lock condition.

Returning to FIG. 11B, lines 1156 and 1162 are seen to be direct to the inputs of an AND gate 1164. Line 1156 is seen to incorporate resistor R98 and is coupled to +12 v through resistor R100, while line 1162 incorporates a corresponding resistor R99 and is coupled to +12 v through resistor R101. Capacitors C82 and C83 provide further filtering for the signals on the line and, where both signals are present to represent a phase lock condition, a corresponding output is provided from gate 1164 at line 1166. This output is inverted at NOR gate 1168 which is seen to be coupled to +12 v in conjunction with filtering capacitor C84. The resultant inverted output at line 1170 is directed to the reset input of a flip-flop 1172 and through line 1174 to the reset terminal of a counter 1176. Coupled to +12 v in conjunction with filtering capacitor C85, the counter 1176 receives the inverter phase C reference signal as developed at line 1058 through line 1178 and functions to count 128 line cycles over an interval of about two seconds to provide a digital filtering function. At the termination of that two seconds, an output is clocked into the clock input of flip-flop 1172 via line 1180. Where there is no phase lock, the counter 1176 and flip-flop 1172 are reset from line 1170. Such digital delay or filtering provided with the arrangement permits an assurance that phase lock indeed is developed and avoids any oscillatory signalling of a phase lock condition. The Q output of flip-flop 1172 at line 1182 is submitted to further delay occasioned with an R-C network comprised of resistors R102 and capacitor C86. This delay permits the inverter 106 to commence running during a transfer condition before the phase lock signal is removed due to line defect or the like. The output of the R-C network is provided at line 1184 which extends with resistor R103 to line 1186 and one input of AND gate 1188. The output of AND gate 1188 is provided at line 1190 and carries a phase locked signal. A feedback path incorporating resistor R104 extends between lines 1190 and 1186. The opposite input to gate 1188 is the lock command (LOCK CMD) which is asserted through resistor R105 in line 1192. A capacitor C87 filters this input. Thus, if there is no command to clock, the apparatus will not indicate a lock condition.

Figure 11C:
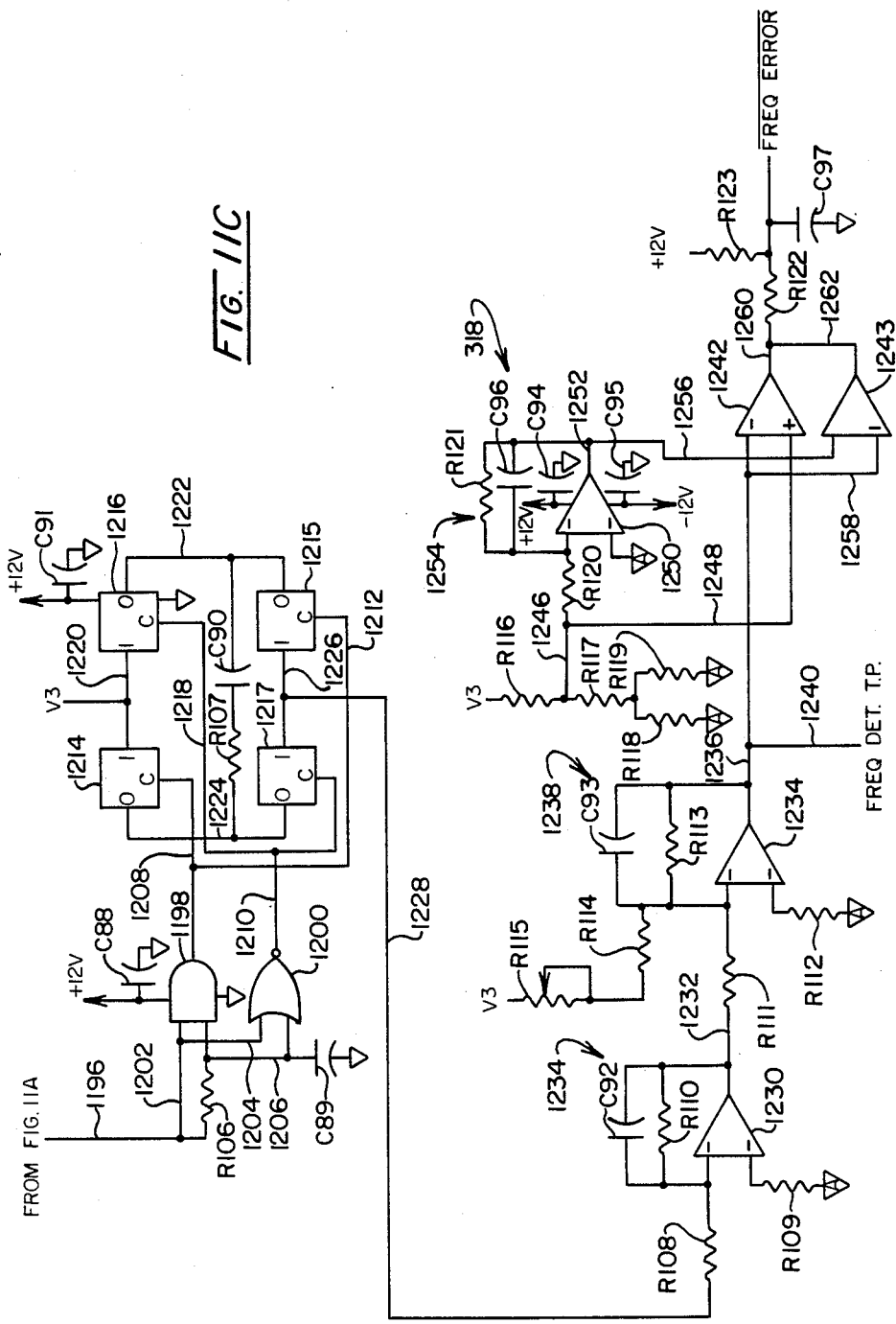

Returning to FIG. 11A, the phase BC reference signal inserted into the phase lock loop system from line 316 also is directed through OR gate 1194 for buffering purposes to emerge at line 1196. Looking to FIG. 11C, line 1196 is shown directed to the inputs of AND gate 1198 and NOR gate 1200. Gate 1198 is seen coupled to +12 v and is filtered by a capacitor C88. One input to each of the gates is provided via lines 1202 and 1204 in direct fashion, while the opposite inputs to the gates from lines 1196 and 1206 are treated by the combination of capacitor C89 and resistor R106. Thus, the outputs of the gates 1198 and 1200 at respective lines 1208 and 1210 are provided as non-overlapping squarewaves similar to those discussed earlier in conjunction with FIG. 7. The squarewaves are introduced from lines 1208 and 1212 to the control inputs of type 4066 analog switches represented, respectively, at 1214 and 1215. Correspondingly, output line 1210 is coupled through line 1218 to the control inputs of analog switches 1216 and 1217. The input terminals of switches 1214 and 1216 are coupled to stable voltage V3 from line 1220, while the outputs of switches 1215 and 1216 are interconnected by line 1221 and the corresponding output of switches 1214 and 1217 are interconnected by line 1224. A combination of resistor R107 and stable capacitor C90 is coupled between the latter lines 1222 and 1224 and the quad combination of devices is seen powered from +12 v as filtered by capacitor C91. With the arrangement thus shown, switches 1216 and 1217 are on together, and switches 1214 and 1215 are on together. A line 1226 couples the inputs of switches 1215 and 1217 and is further coupled via line 1228 and resistor R108 to the inverting input of an operational amplifier 1230. With the driving of switches 1214-1217 as shown, the capacitor C90 is either connected to one end of the reference V3 and through resistor 108 to amplifier 1230 or for a next ensuing half cycle, an opposite coupling obtains. The non-inverting input to amplifier 1230 is coupled to analog ground through resistor R109 and its output at line 1232 is shown coupled to a feedback path extending to line 1228 and incorporating capacitor C92 and resistor R10. The driving of switches 1214-1217 produces a current due to charging and discharging stable capacitor C90 which has constant direction and is applied to the inverting input of amplifier 1230 via line 1228 and register R108. The amplifier responds by producing a voltage at line 1232 that induces an equal but opposite current in the feedback elements C92 and R110. Thus the circuit acts as a charge pump sensitive to frequency. With alternate cycling, the capacitor will charge at a given rate, the only parameters affecting this being the voltage, capacitance, and frequency. Accordingly, the output line 1232 will assume a voltage which is proportional to frequency. Line 1232 extends through resistor R111 to the inverting input of another operational amplifier 1234 having its non-inverting input coupled through resistor R112 to ground and its output at line 1236 coupled to a feedback path 1238 incorporating not only R113 and serially connected variable resistor R115 which, in turn, is coupled to stable voltage source V3. Resistor R115 is adjusted so that in conjunction with resistor R114 such that with a predetermined proper frequency asserted into the circuit there will be a zero output at output line 1236. Adjustment can be detected at test point line 1240. For example adjustment can be provided by connecting the circuit to a 60 Hz power source. The value of signal at line 1236 is tested by comparator stages 1242 and 1243. A positive reference for comparator 1242 is generated from stable source V3 by a divider network including resistors R116–R119 coupled between V3 and ground. This network is tapped at line 1246 and the reference is seen extending via line 1248 to the positive input of comparator 1242. A reference at line 1246 further is inverted by application through resistor R120 to the inverting input of operational amplifier 1250, the non-inverting input of which is coupled to analog ground. Amplifier 1250 is supplied from both +12 v and −12 v supply as filtered by capacitors C94 and C95 and its output at line 1252 extends to a feedback path represented generally at 1254 and including resistor R121 and capacitor C96. The resultant reference output at line 1256 is asserted at the negative input of comparator 1243. With the arrangement shown, upon asserting the signal at line 1236 to the negative input terminal of comparator 1242 and via line 1258 to the positive terminal of comparator 1243, the outputs of these comparators at lines 1260 and 1262 will be at a logic high where the value of signal at line 1236 falls within a requisite window established by the noted references. Line 1260 is seen to incorporate resistor R122 and to be coupled to +12 v through pull-up resistor R123. A capacitor C97 functions to filter the line which evolves the control signal presenting frequency error (FREQ ERROR).

The frequency error signal is used to qualify the line input. For example, if a diesel generator is employed for that input then the system may wish to retain a power path including the inverter 106 until such time as the frequency output of such generator is stabilized.

Figure 12:
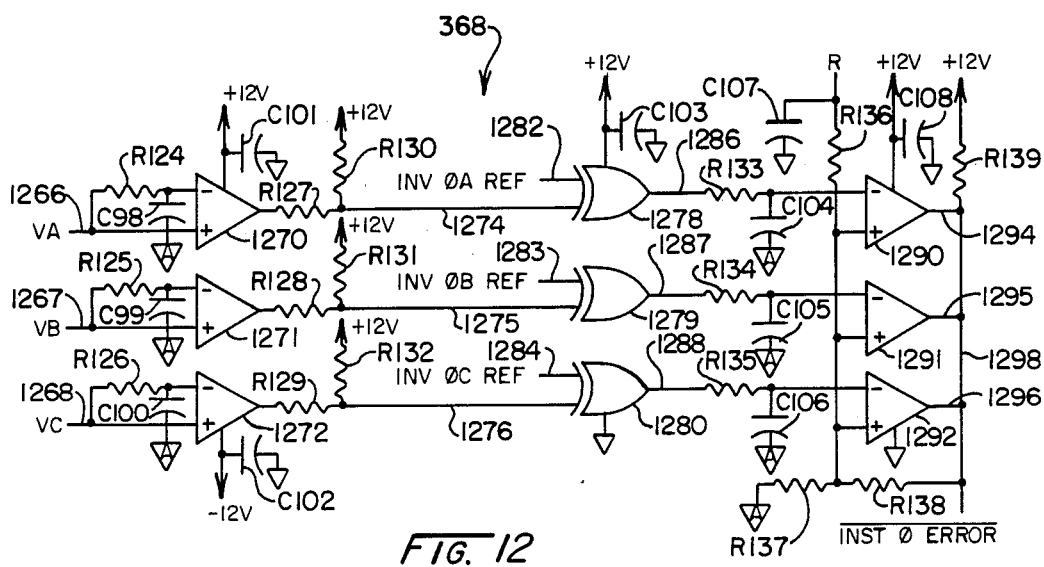
FIG. 12 is an electrical schematic circuit drawing showing a technique for deriving instantaneous phase error.

Referring to FIG. 12, the line phase and phase lock loop comparison network described in conjunction with block 368 in FIG. 2A is revealed at an enhanced level of detail. The circuit employs the analog valuations for line-to-neutral voltage and input as have been labeled VA, VB, and VC and which are applied, respectively, to lines 1266–1268 for application to the non-inverting side of respective operational amplifiers 1270–1272. The inverting inputs to these amplifiers are supplied with an averaged version of the signals by virtue of the R-C networks represented by resistors R124–R126 and capacitors C98–C110. Such latter arrangement avoids offset error. The amplification stages are shown coupled to +12 v as filtered by capacitor C101 and to −12 v as filtered by capacitor C102. The outputs of the devices 1270–1272 are provided at respective lines 1274–1276 which incorporate respective resistors R127–R129 and are coupled to +12 v through respective resistors R130–R132. Squarewave signals result at these output lines 1274–1276 which are level adjusted in consonance with the signals developed for inverter drive as described at lines 1056–1058 in FIG. 11B. These inverter phase reference signals from lines 1056–1058 are asserted via corresponding respective lines 1282–1284 to one input of exclusive OR gates 1278–1280, while the signals at lines 1274–1276 are asserted, respectively, at the opposite inputs to these gates. The group of exclusive OR gates is shown coupled via gate 1278 to +12 v as filtered by capacitor C103.

If there is phase correspondence between the inverter reference phase and the detected line signals asserted to gates 1278–1280, then no output will occur. However, should a variation between the two phases occur, then a finite value will occur at the appropriate output of gates 1278–1280 as represented at respective lines 1286–1288. Because the phase lock loop exhibits a form of electronic momentum, it will be slow to change, whereas line phase variations will occur quickly as a phase alteration. It should be noted that the circuit will respond to a shift in one phase alone or to an unsymmetric distortion on any one phase as well as a simultaneous shift in all three phases. Thus, a form of electronic "hair trigger" is achieved to very quickly detect line fault. Of particular importance, the fault is detected with immunity from any regenerative effects which may occur in consequence of the operational characteristics of the line regulator 86 (FIG. 2B). The signals at lines 1286–1288 are filtered by the resistor grouping R133–R135 performing in conjunction with respective capacitors C104–C106 coupled between respective lines 1286–1288 and analog ground. The thus-filtered signals from lines 1286–1288 are introduced to one input of respective comparators 1290–1292, while the opposite input thereto is coupled to receive a reference voltage developed from source, R, as adjusted by capacitor C107 and resistor grouping R136–R138. Comparators 1290–1292 are coupled as represented at comparator 1290 to +12 v as filtered by capacitor C108 and their outputs at respective lines 1294–1296 are coupled in common to line 1298 which, in turn, is connected to +12 v through resistor R139.

With the arrangement shown, an error detected in any phase A, B, or C will be detected and presented at line 1298 as an instantaneous phase error which will cause a transfer of power path to the battery-inverter 106 combination.

Figure 13A:
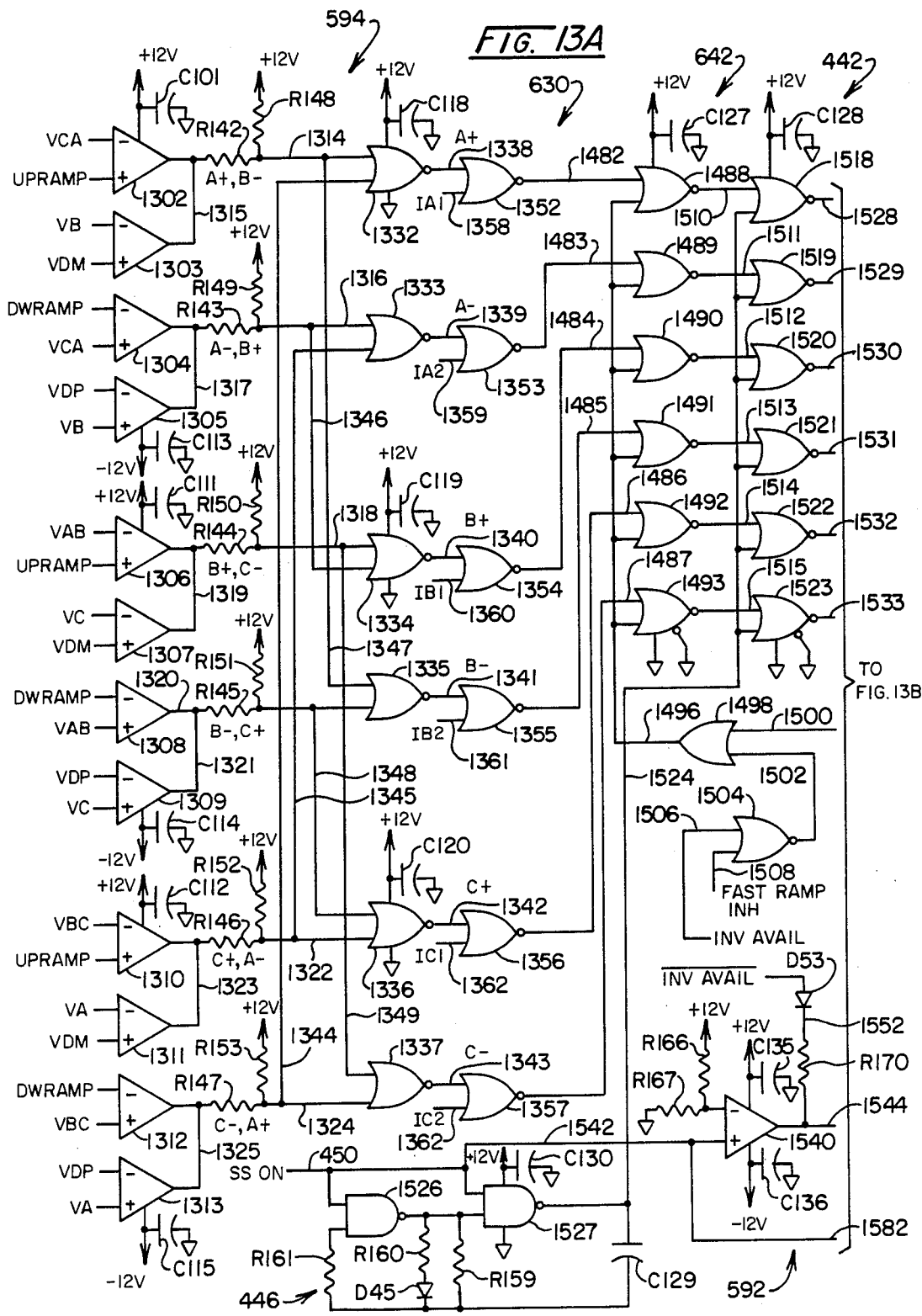

Referring to FIG. 13A, the ramp-phase comparator network discussed in conjunction with block 594 in FIG. 2A is illustrated at an enhanced level of detail. In its general operation, sinusoidal line phases are identified to the extent necessary and combined to find SCR firing points with a ramp voltage which increases relatively gradually at about 5 v per second to develop a full ramp excursion over an interval of about two seconds. Pure isolation of the individual phase sinusoids of the line input is not required, however, an ambiguity wherein a given half cycle of a sinusoid may be intersected twice for a given ramp level is accommodated for. This accommodation is made by examination of the line sinusoids to develop combinations assuring a singular ramp sinusoid intersection election. In FIG. 13A, type 339 comparators 1302–1313 are paired to evolve a logical AND condition. The comparator grouping is shown coupled to +12 v and −12 v with filtering associated therewith by respective capacitors C110, C111, C112 and C113, C114, C115. Looking to comparators 1302 and 1303, it may be observed that the signal VCA representing an analog of the line-to-line input from phase C to phase A developed as described in conjunction with FIG. 9 is combined with an up-ramp signal to provide an output at line 1314. Correspondingly, the line-to-neutral analog signal, B, the development of which is described in conjunction with FIG. 10, is combined with a small, voltage drop form of signal, VDM, to provide an output at line 315 which is coupled with output line 314 from gate 1302. There results a signal presented through resistor R142 and treated by pull-up resistor 148 coupled to +12 v which is representative of an up-ramp intersection with the positive going half cycle of phase A (A+) and the negative going half cycle of phase B (B−).

Looking momentarily to FIG. 14, the derivation of the latter minor voltage is represented. In this regard, a line 1326 is shown coupled between +12 v and −12 v and to be incorporating resistors R154 and R155 adjacent to which the lines 1328 and 1329 are seen to carry, respectively, the VDP and VDM signals or references. Diodes D43 and D44 are positioned intermediate the latter lines and analog ground at line 1330.

Returning to FIG. 13A, comparator 1304 may be observed to receive a down ramp signal in addition to the line-to-line voltage analog signal VCA. The down-ramp signal is identical to the up-ramp signal but reversed in polarity. The output of gate 1304 at line 1316 is combined with the output of gate 1305 at 1317. Gate 1305 is seen to receive the small VDP reference along with the line-to-neutral analog signal VB for the B phase. The result as treated by resistors R143 and pull-up resistor R149 is a signal representing intersections with the negative going half cycle of phase A and the positive going half cycle of phase B. Remaining gates 1306-1313 will be seen to provide corresponding logic identified by the labelling B+, C−; B−, C+; C+, A−; and C−, A+. These signals then are combined in a sequence of NOR gate 1332-1337 to derive the SCR firing signals for the positive and negative cycles of phases A, B, and C at the static switch 82 (FIG. 2B). Gates 1332-1337 are coupled between power supply ground and +12 v which is filtered as represented by capacitors C118-C120. The outputs of gates 1332-1337 are provided, respectively, at lines 1338-1343 which are shown labelled carrying the SCR half cycle identification pertinent to the signals present thereat. To derive the A+ signal at line 1338, the signals asserted at gate 1332 include the A+, B− signal at line 1314 and the C−, A+ signal derived from line 1324 and asserted through line 1344. In similar fashion, the A− cycle signals at line 1339 are derived by the combination of the A−, B+ signals at line 1316 and the C+, A− signals derived from line 1322 and asserted via line 1345. Similarly, the B+ firing signals at line 1340 are derived by the combination of B+, C− signals at line 1318 and the A−, B+ signals developed at line 1316 and transmitted via line 1346. The B-firing signals at line 1341 are seen to be developed from the A+, B− signals at line 1314 which are transmitted by line 1347 and the B−, C+ signals at line 1320. In similar fashion, the C+ firing signals at line 1342 are derived by the combination of B−, C+ signals developed at line 1320 and transmitted via line 1348 to gate 1336. The opposite input to the latter gate is developed as signal C+, A− at line 1322. Finally, the C− firing signals at line 1343 are derived by the combination of B+, C− signals derived at line 1318 and transmitted by line 1349 combined with the C−, A+ signals developed at line 1324.

As described in conjunction with block 630 in FIG. 2B, there exists a possibility that incorrect firing of the static switch 82 may occur with respect to the corresponding switching at inverter 106. To assure appropriate control, the interlock circuit 630 comprised of NOR gates 1352-1357 are provided. These gates receive the SCR firing signals from respective lines 1338-1343 as well as a treated signal representing inverter switching data which will override the SCR firing signals if proper correspondence between the switching activities are not present. The signals asserted for this interlocking purpose to gates 1352-1357 are provided, respectively, at lines 1358-1363.

Figure 15:
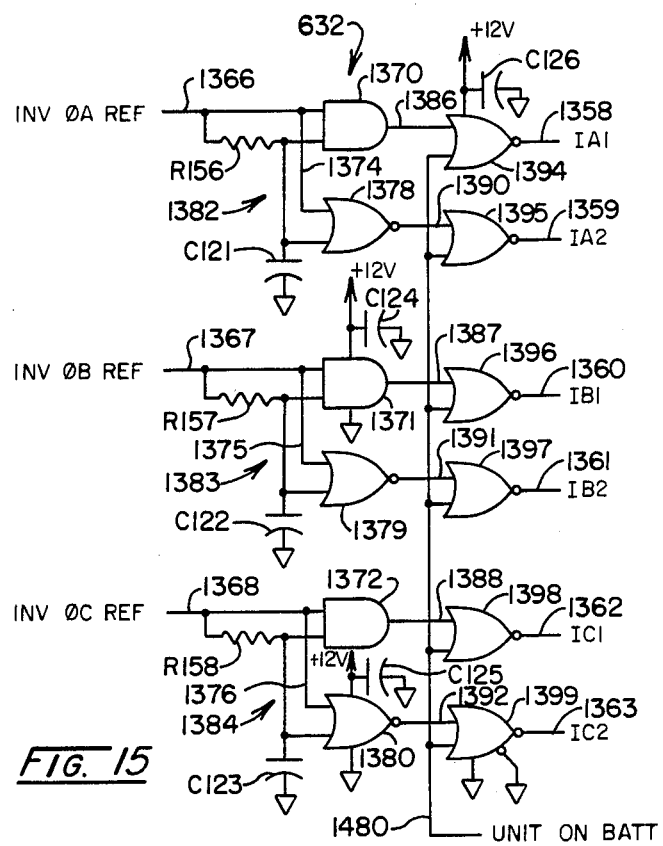
FIG. 15 is an electrical schematic drawing showing components for developing inverter reference non-overlapping squarewave signals.

Turning momentarily to FIG. 15, the network for deriving non-overlapping square waves employed with the interlock network 630 are represented generally at 632 in correspondence with block 632 in FIG. 2A. The network 632 receives the inverter reference signals as developed from counter 1128 as described in FIG. 11B. These squarewave reference signals, as developed at lines 1056-1058, are asserted at corresponding respective lines 1366-1368 of network 632. The inputs from these lines extend to one input of respective AND gates 1370-1372. The signals additionally are submitted simultaneously through respective lines 1374-1376 to one input of respective NOR gates 1378-1380. The opposite inputs to each of these gates 1370-1372 and 1378-1380 are derived from networks 1382-1384 incorporating resistors R156-R158 and capacitors C121-C123. AND gate grouping 1370-1372 is shown to be coupled with +12 v and power supply ground and the former is seen to be filtered by capacitor C124. Similarly, NOR gate grouping 1378-1380 is seen to be coupled between power supply ground and +12 v which is filtered by capacitor C125. With the arrangement shown, the outputs of gates 1370-1372 at respective lines 1386-1388 and of gates 1378-1380 at respective lines 1390-1392 are non-overlapping with respect to the inverter drive signals in the manner described and illustrated in FIG. 7 above. These outputs are directed to the inputs of a grouping of six NOR gates 1394-1399 for presentation a the output lines thereof shown, respectively, at 1358-1363 and labelled IA1, IA2, IB1, IB2, IC1, and IC2.

The control of the instant apparatus is established to provide that the instant ramp-up system is under way or the static switch 82 is fully turned on. Thus, the instant network 632 is disabled when the inverter 106 is no longer in a switching condition. Accordingly, enablement is provided to each of the gates 1394-1399 from line 1480 which carries the "UNIT ON $\overline{\text{BATT}}$" signal a logic high value of which will prohibit pass through signals to output lines 1358-1363. The NOR gates 1394-1399 are seen to be coupled with +12 v which is filtered by capacitor C126.

Returning to FIG. 13A, the interlocking signals from network 632 are again shown at lines 1358-1363 as extending to respective NOR gates 1352-1357 to effect the interlock function. The outputs of gates 1352-1357 are present at lines 1482-1487 which extend, in turn, to respective NOR gates 1488-1493.

At the termination of reacquisition of power flow path by the static switch 82 or at such time as an inverter failure may occur or the like, it is desirable to turn the SCRs of the static switch 82 to on their full extent. This is carried out by the network described in conjunction with block 642 in FIG. 2B and represented generally by the same numeration in the instant figure and comprising the noted NOR gates 1488-1493. The opposite input to these gates is provided from line 1496 which, if at a logic high value, will block passage of signals through the noted gates. Line 1496 represents the output of OR gate 1498, the inputs to which represent a ramp ending developed from line 1500 or a loss of inverter availability as represented by a signal at line 1502. Line 1502, in turn, represents a signal derived from NOR gate 1504 which receives the inverter available signal at line 1506 or a fast ramp inhibit signal at line 1508. The latter signal derives from the switching logic circuit 78 (FIG. 2B) and will provide a signal prohibiting turning the static switch fully on under certain circumstances selected as representing potential damage to the system. It may be observed that the gates 1488-1493 are coupled to +12 v at gate 1488, the source input thereto being filtered by capacitor C127.

The outputs of gates 1488-1493 are provided, respectively, at lines 1510-1515 and are directed to another grouping of six NOR gates shown, respectively, at 1518-1523. These gates are coupled with +12 v source which is filtered at capacitor C128. The opposite input to gates 1518-1523 is provided from line 1524 which extends to an oscillator described in conjunction with block 446 in FIG. 2B. This oscillator network 446 is turne don by the "SS ON" signal at line 450 and is comprised of NAND gates 1526 and 1527 which are configured in conjunction with capacitor C129, resistors R159-R161 and diode D45 to provide a relaxation oscillator structure having a relatively high frequency. Such frequency is selected principally for the purpose of an isolated inductive coupling to the SCRs of the static switch 82. The gates 1526 and 1527 are shown coupled to +12 v supply which is filtered by capacitor C130. It may be noted that the gate groupings 1581-1523 are coupled with +12 v supply which is filtered by capacitor C128 and provides outputs at respective lines 1528-1533. Turning to FIG. 13B, lines 1528-1533 carrying the high frequency gating pulses sometimes referred to as "picket fence" pulses because of their resemblance thereto, are asserted to the gate electrodes of a sequence of field effect transistors (FET) 212-217. The drain electrode of each of these transistors Q12-Q17 is coupled with respective current limiting resistors R162-R167 which are additionally coupled in parallel with diodes D46-D51, which, in turn, are coupled to line 1534. Drive power supply to the source terminals of the FETs Q12-Q17 derives from line 1534 which is coupled to +24 v at line 1536 incorporating diode D52. The labelled SCR drive outputs through resistors R162-167 ar coupled to the primaries of isolation transformers as described at 196 and 200 in FIG. 3.

Referring to FIG. 13A, the ramp generating network described in FIG. 2A in conjunction with block 592 is illustrated at an enhanced level of detail. In this regard, it may be observed that the static switch on (SS ON) asserted to the oscillator stage 446 at reproduced line 450 also is applied to a level shifting comparator 1540 via line 1542. To develop this level shifting function, the reference input thereto at resistors R166 and R167 coupled respectively to +12 v source and power supply ground provides a set threshold. Comparator 1540 is shown coupled to +12 v and −12 v source as is filtered by respective capacitors C135 and C136. The output of the stage at line 1544 normally carries a negative voltage which, a shown in FIG. 13B, is applied from resistors 168 to the inverting side of an integrator stage comprised of operational amplifier 1546 having its feedback path at line 1548 incorporating integrating capacitor C137. A second input to the amplifier 1546 extends from a reference, R through resistor R169 to provide a ramp output at line 1550. Thus, in the absence of a static switch on (SS ON) signal at line 1542, the static switch is considered to be off, the negative value at line 1544 dominates the system and forces the integrator stage at 1546 to ramp-up in positive fashion fairly quicky. However, when the static switch on (SS ON) signal is applied, the output at line 1544, being an open collector circuit, assumes a logic high and the device is effectively removed from the circuit and resistor R168 essentially is ignored.

Returning momentarily to FIG. 13A, in the event that the inverter becomes unavailable, i.e. it fails, the corresponding signal associated therewith at line 1552 applies current through diode D53 and resistor R170 to cause the integrator stage 1546 to ramp-up quite rapidly over a matter of cycles as opposed to seconds. Thus, in the event the inverter fails it may be possible to bring the static switch back into operation as soon as possible. Because the system is in the course of ramping as this would occur, the unacceptable surge currents through the inverter output would not be experienced.

Returning to FIG. 13B, the integrator stage at 1546 has a gain equivalent to about 5 v per second and thus requires a few seconds to achieve a full ramp excursion. The output at line 1550 in defining a ramp commences at a positive level and ramps down to the negative power supply rail. This achieves a "down ramp" which is clamped slightly below ground. The latter down ramp signal is seen supplied via line 1552 and resistor R171. Ramping diode D44 is shown coupled between line 1552 and analog ground. Such down ramp signal at line 1550 also is applied through resistor R172 to one input of operational amplifier stage 1554 powered from +12 v and −12 v supply as filtered, respectively, by capacitors C138 and C139. The positive terminal of amplifier 1554 is coupled to analog ground, while its output at line 1556 is coupled with a feedback path incorporating resistor R173 at line 1558. A thus-inverted ramp signal is applied through resistor R174 to provide an up-ramp signal which is clamped via diode D55, the up-ramp commencing below ground level in complement with the down ramp signal.

The down ramp signal at line 1550 additionally is applied via line 1558 and resistor R175 to one input of operational amplifier stage 1560. The output of this stage at line 1562 is coupled with a feedback path incorporating diode D56, resistor R176 and a resistor R177 coupled to reference, R. The opposite input to stage 1560 is derived from operational amplifier 1564 which receives the clamped version of the down ramp signal at its line 1564 as derived at line 1552. Amplifier 1564 provides an output at line 1568 which is coupled to feedback path 1570 and the amplifier additionally is coupled between +12 v and −12 v source which is respectively filtered by capacitor C142 and C141. The output line 1568 extends through resistor R178 and is adjusted by resistor R179 coupled to analog ground for application to the opposite input of stage 1560. With the arrangement, the unclamped and clamped version of the down ramp signal are compared and when the clamp level is reached, a signal at line 1562 is employed to remove the earlier-described 30° phase lag applied to the phase lock loop 164 as described at line 600 in FIG. 2A. The signal at line 1562 is level adjusted by application through resistor R180 to operational amplifier stage 1570, the output of which represents the noted signal ($\phi$ CNTRL) identified by the numeral 600. A feedback path incorporating resistor R181 extends from the output to the inverting input of stage 1570, while the non-inverting input thereof is coupled to analog ground.

The ramp signal at line 1558 also is submitted through resistor R182 to the positive input of a comparator stage 1572. The opposite input to the stage 1572 is a reference derived from resistor R184 coupled to reference, R, as well as a resistor R183 coupled to analog ground. The output of stage 1572 is provided at lines 1574, 1500 and 1576 and a feedback incorporating resistor R185 is shown coupled between line 1558 and line 1500. At the termination of a ramp as detected by the comparator stage 1572, the output thereof at line 1576 is converted to an acceptable logic level by resistors 186 and 187 for presentation along line 1578 to one input of NAND gate 1580. The opposite input to gate 1580 carries the static switch on signal from line 1582 and the output thereof at line 1584 is labelled "UNIT ON SS". This unit on static switch indication can be provided as a perceptible output to the user and also may be employed to return the inverter to a fully stand-by status as represented at line 544 in FIG. 2C. The signal at lines 1574 and 1500 also is directed through a 100 microsecond delay network comprised of resistors R188, R189 and capacitor C142 to be presented at a 100 microsecond delay following the turning off of the inverter 106 at line 1500 to the gate array 1488-1493 shown in FIG. 13A. This signal then provides for the full turning on of the gating signals to the SCRs of static switch 82.

Now considering the charging arrangement for the battery 122 described in conjunction with FIG. 2B, the preferred arrangement for the instant apparatus is a circuit generally referred to as a "buck regulator". In general, a d.c. source of power having d.c. voltage values higher than the battery is provided. This voltage then is regulated through the regulator 124, providing a select voltage drop by pulse width modulating current to an inductor. Control of this regulator is based upon the current flow as described in conjunction with block 134 in FIG. 2B. Looking to FIG. 16, the regulator is schematically portrayed as including a transistor Q18 which is controlled to switch on or off by a drive circuit represented at block 1586. The emitter and collector of transistor Q18 are shown connected within a line 1588 which along with line 1589 is coupled to the noted d.c. energy source as labelled. An electrolytic capacitor C143 is shown coupled across and representing the source, while an inductor 1590 is coupled in the circuit between the battery to be charged and the transistor Q18. A free-wheeling diode D57 is connected across lines 1588 and 1589, while a capacitor C144 provides ripple filtering and diode D58 assures against reverse power flow. In typical fashion, a snubber diode D59 is shown coupled across the collector and emitter of transistor Q18. Control over the circuit by d.c. current monitoring is represented by the d.c. current sensor 134 which may, for example, be a Hall effect device or the like. In general, as transistor Q1 is turned on, assuming that the energy source of voltage is greater than that of battery 122, current will rise in the inductor 1590 in proportion to the voltage difference divided by the inductance. As the ramping current reaches a program value, transistor Q18 turns off and charging current to the battery 122 continues through free-wheeling diode D57. Generally control from driver 1586 is such that the duty cycle on time of transistor Q18 is the ratio of the charging and battery voltages.

Figure 17:
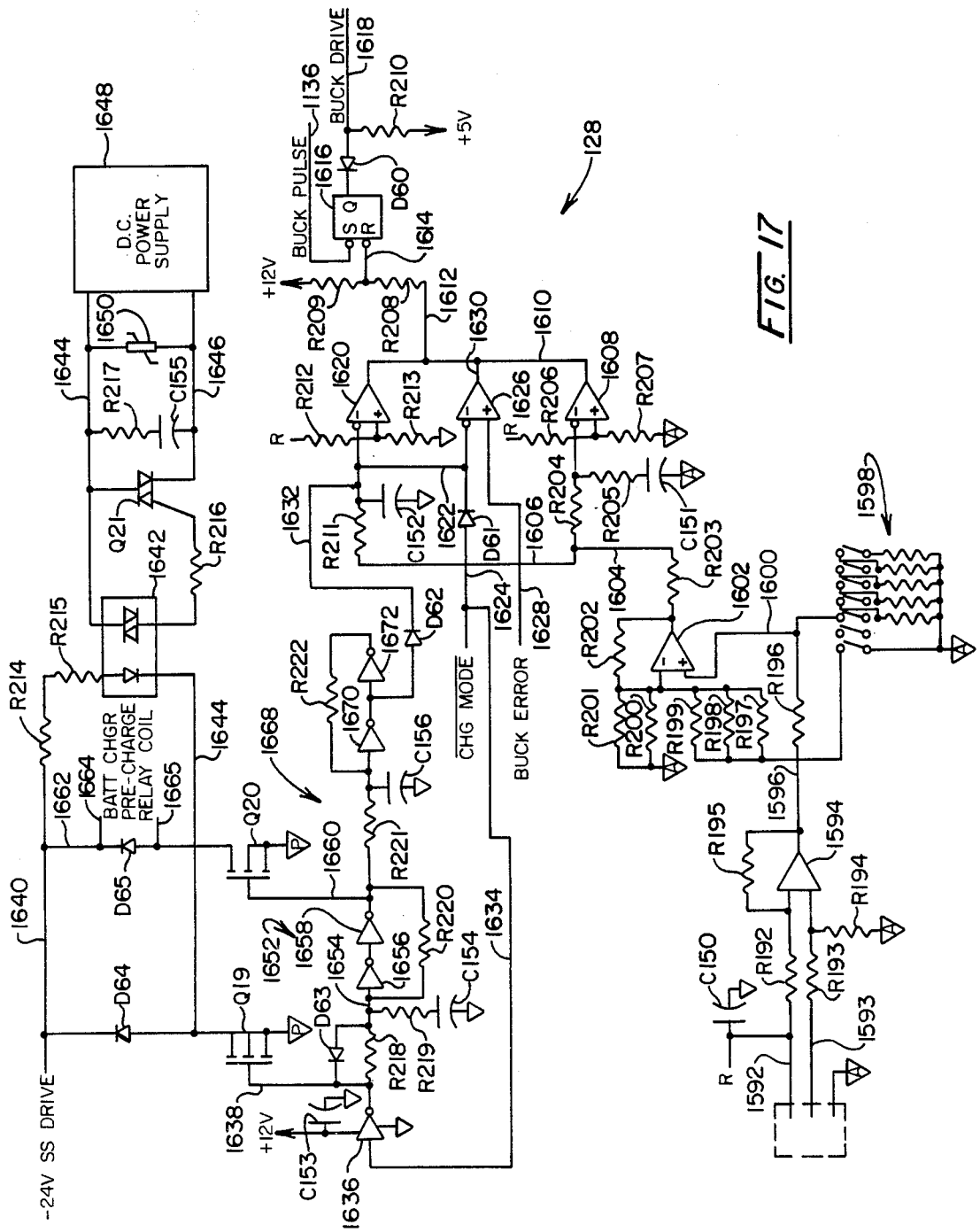
FIG. 17 is an electrical schematic drawing showing a battery charge control circuit.

Looking to FIG. 17, control features for the battery charging arrangement are further detailed. In the figure, the output of the d.c. current sensor 134 is applied to lines 1592 and 1593 for appropriate treatment and scaling. In this regard, a capacitor C150 and reference input are applied to line 1592 while that line and line 1593 incorporate respective resistors R192 and R193. Additionally, resistor R194 is coupled between line 1593 and analog ground. Further scaling is applied from an operational amplifier 1594 shown having a feedback path including resistor R195. The output of amplification stage 1594 at line 1596 becomes further adjustable from selection of the switching and resistor grouping at 1598 whereupon, the scaled current input signal is applied via line 1600 to one input of operational amplifier 1602. The opposite input to amplifier 1602 is derived from a scaling network comprised of resistors R197-R202. The output of stage 1602 at line 1604 and resistor 203 is a voltage analog of the scaled current which is applied to comparator stages in conjunction with a signal identified as "BUCK ERROR" representing the error in voltage between the instantaneous battery voltage and desired levels.

Figure 16:
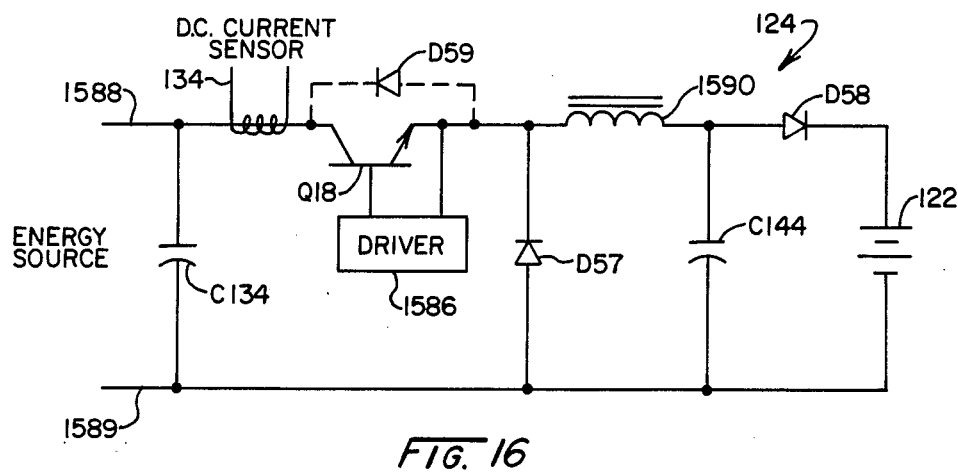
FIG. 16 is an electrical schematic drawing showing a regulator circuit employed with the battery charging features of the instant invention.

Line 1604 is seen directed to line 1606 and an averaging network comprised of resistors R204, R205 and capacitor C151. This provides an averaging of the currents sensed which is submitted to a comparator stage 1608. The opposite side at stage 1608 is provided with reference signal derived from resistors R206 and R207 coupled between reference source, R, and analog ground. At such time as average current values are excessive, a resultant low value occurs at output line 1610 which is seen to extend to line 1612 incorporating resistors R208 and R209 and coupled to +12 v source. Resistors R208 and R209 are tapped at line 1614 which, in turn, is connected to the reset input of a flip-flop 1616. The buck drive transistor function as described at Q18 in conjunction with FIG. 16 is driven at a nominal 360 Hz by a "buck phase" which was derived as described at line 1136 in FIG. 11B. that line numeration again is reproduced as being asserted to the set terminal of flip-flop 1616. Drive to the noted transistor function Q18 is provided from the Q terminal of device 1616 as represented at line 1618 which is seen to incorporate diode D60 and incorporate pull-up resistor R210 coupled to +5 v.

Line 1606 also is seen to be directed through a filtering network comprised of resistor R211 and capacitor C152 to one input of comparator stage 1620. Stage 1620 derives an error signal when predetermined peak current limits are exceeded. The reference for achieving this is provided from resistors R212 and R213 which are coupled between reference source, R, and power supply ground. Thus, should the currents be exceeded an appropriate signal will be applied from comparator 1620 to line 1610 to effect a resetting of flip-flop 1616 and lower the duty cycle otherwise asserted from the constant buck pulse input at line 1136. The same filtered signal at line 1606 additionally is asserted via lines 1622 and 1624 to a comparator stage 1626, the opposite input to which carries the noted BUCK ERROR signal at line 1628. This latter signal is the difference between the predetermined float voltage set point and actual instantaneous battery voltage. Comparator 1626 is coupled to line 1610 by line 1630 and thus, as float set point voltage at the battery is approached, comparator 1626 will tend to effect dominant control of the battery charging system. Buck drive at line 1618 can be shut off completely by application of a charge mode not signal from line 1624 through diode D61 such that charging does not occur during any interval of operation considered inappropriate as during operation with a power flow path through the inverter 106. This same form of cut-off can be asserted via line 1632 through diode D62.

The charge mode signal also is applied to line 1634 which extends to the input of a buffer stage 1636 shown coupled between power supply ground and +12 v, the latter being filtered by capacitor C153. The resultant output of stage 1636 is applied as a gate input to FET transistor Q19 via line 1638. As transistor Q19 turns on, a circuit including a +24 v source at line 1640, resistors R214 and R215, opto-coupler 1642, line 1644, and diode D64 is closed. The thus-activated opto-coupler 1642 activates a network including triac Q21 and resistor R216. This effects the activation of a d.c. power supply via line 1644 and 1646 and represented by block 1648. The charging circuit is protected by resistor R217 and capacitor C155 as well as a metal oxide varistor 1650. During initial powering up of the system, it is necessary to selectively insert a current limiting resistor into the charging circuit and this is carried out with the turning on of transistor Q19. However, following about a 5 to 6 second delay, it is necessary to shunt this charging resistor out of the circuit. To carry this out, a delay network 1652 is provided which responds to the output of buffer stage 1636. Network 1652 is comprised of resistors R218, R219, capacitor C154 and diode D63. The output of network 1652 at line 1654 is directed through two buffer stages 1656 and 1658 to be presented at line 1660 to the gate of a transistor Q20. Transistor Q20 is coupled between source input line 1640 and power supply ground at line 1662 and provides a selective shunting of the noted charging resistor through lines 1664 and 1665 positioned on either side of a diode D65. A by-pass resistor R220 extends about buffer stages 1656 and 1658 to provide a subsequent signal input to another delay network represented generally at 1668. This network, including resistor R221 and capacitor C156 provides about a one second delay functioning to hold off charging activity from line 1632 until such time as all relay activity is terminated. The network leads to buffer components 1670 and 1672 intercoupled by resistor R222.

Since certain changes may be made in the above-described system, method and apparatus without departing from the scope of the invention herein involved, it is intended that all matter contained in the description thereof or shown in the accompany drawings shall be interpreted as illustrative and not in a limiting sense.

We claim:

1. Apparatus for use with a waveform synthesizing line regulator having an input and an output connectable with a load, said apparatus being connectable with a line power source of given frequency, variable voltage of given peak value and waveshape and comprising:
   static switch means connectable intermediate said source and said line regulator input and actuable between conducting and non-conducting states for selectively conveying power from said source to said regulator input;
   means deriving a stand-by source of d.c. power;
   an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch control signals; and
   control means for monitoring the condition of said line power source and responsive to predetermined defects therein including defects discernable from phase information to actuate said static switch from said conducting to said non-conducting state and to apply said switch control signals to said solid-state switching means so as to provide said active state control of said inverter and effect a transfer of power flow from said static switch means to said inverter.

2. The apparatus of claim 1 including:
   precharge circuit means coupled with said inverter d.c. energy storing bus means for providing, when activated, a d.c. voltage thereat having a predetermined transfer value; and
   said control means is responsive to the presence of said predetermined transfer value as a condition for effecting said transfer of power flow.

3. The apparatus of claim 1 in which:
   said control means includes line monitoring means responsive to said line power source for deriving instantaneous phase information corresponding therewith; and
   said control means is responsive to predetermined values of variation of said instantaneous phase information as a said predetermined defect.

4. The apparatus of claim 1 in which said control means includes:
   line monitoring means responsive to said line power source for deriving instantaneous phase information corresponding therewith;
   an inverter oscillator controllable to provide said switch control signals;
   phase lock network means controllable for selectively synchronizing said switch control signals with said instantaneous phase information; and
   comparison means responsive to instantaneous phase deviation of predetermined value between said switch control signals in the presence of said synchronization and said line monitoring means instantaneous phase information for deriving an instantaneous phase error signal as a said predetermined defect.

5. Apparatus for use with a waveform synthesizing line regulator having an input connectable with a line power source of given frequency, voltage and sinusoidal waveform, comprising:
   static switch means connectible intermediate said source and said line regulator input, actuable into a conducting state and commutatable to a non-conducting condition in the absence of said actuation;
   means deriving a stand-by source of d.c. power;
   an inverter including d.c. energy storing means for connection in energy exchange relationship with said stand-by source, solid-state switch means responsive to switch control signals to derive an unregulated, substantially square waveform from said d.c. energy storing means at an inverter output;
   inductor means connectable intermediate said inverter output and said line regulator input for effecting current flow limitation; and
   control means including:
   transfer circuit means comprising:
   line responsive means for monitoring the condition of said line power source and having a transfer condition in response to predetermined defects of said power source,
   an inverter oscillator for providing select said switch control signals,
   phase lock network means controllable for selectively synchronizing said switch control signals with said line power source waveform,
   transfer control means responsive to said transfer condition for effecting said static switch means commutation and applying said switch control signals to said solid-state switch means to derive said square waveform at said inverter output for application to said line regulator input through said inductor means; and reacquire circuit means for transferring power flow to said line regulator input from said inverter and stand-by source of d.c. power to said line power source, comprising graduated firing circuit means responsive to said line monitoring means for deriving a reacquire switching output for effecting a select actuation of said static switch means during each half cycle of said sinusoid waveform to sum energy therefrom with said inverter square waveform and effect a corresponding elevation of the voltage amplitude at said inverter d.c. energy storing means until a correspondence thereof with the peak voltage amplitude of said line power source waveform is developed, said reacquire circuit means fully actuating said static switch means substantially when said correspondence is achieved.

6. The apparatus of claim 5 in which said reacquire circuit means includes phase control means for effecting a predetermined variance between the zero cross-over occasions of said inverter square waveform and said line source sinusoidal voltage waveform.

7. The apparatus of claim 5 in which said reacquire circuit means includes:

non-overlapping wave generator means for deriving a non-overlapping oscillatory output from said inverter oscillator having a waveform transition occurring non-simultaneously with corresponding transitions of said switch control signals; and interlock network means for effecting synchronizing enablement of said reacquire switching output with said non-overlapping oscillatory output so as to isolate switching events at said inverter switch means from switching events at said static switch means.

8. The apparatus of claim 5 in which said control means includes:

line monitoring means responsive to said line power source for deriving instantaneous phase information signals corresponding with said given graduated firing circuit means includes:

ramp current means for generating ramp signals of voltage varying at a predetermined rate from a first to a second level; and ramp-phase comparator means responsive to said ramp signals and to said instantaneous phase information signals for deriving said require switching output.

9. The apparatus of claim 8 in which said reacquire circuit means includes ramp terminate detect network means responsive to said ramp signal voltage reaching said second level to effect said full actuation of said static switch means.

10. The apparatus of claim 5 in which said transfer circuit means includes:

precharge circuit means coupled with said inverter d.c. energy storing means for providing, when activated, a d.c. voltage thereat having a predetermined transfer value corresponding with the peak said voltage of said line power source; and said control means effects said precharge circuit means activation when said static switch means is in said conducting state.

11. The apparatus of claim 5 in which;

said line monitoring means is responsive to said line power source for deriving instantaneous phase information corresponding therewith and derives said transfer condition in response to predetermined values of variation of said instantaneous phase information.

12. The apparatus of claim 5 in which said transfer circuit means includes commutation circuit means for commutating said static switch means to said non-conducting state by select application of said switch control signals to said inverter solid-state means.

13. The apparatus of claim 12 in which said transfer circuit means includes:

precharge circuit means coupled with said inverter d.c. energy storing means for selectively grounding a d.c. transfer value corresponding with the peak said voltage of said line power source.

14. The apparatus of claim 12 in which said transfer circuit means includes commutation interval timing means responsive to said transfer condition for deriving a predetermined interval within which said commutation of said static switch means is carried out to achieve said non-conducting state.

15. The apparatus of claim 5 in which:

said transfer circuit means line responsive means is responsive to said line power source for deriving instantaneous phase information corresponding therewith; and said line response means further includes comparison means responsive to to said switch control signals occurring in the presence of said phase lock network means synchronization and to said line responsive means instantaneous phase information for detecting the presence of phase deviation therebetween to derive said transfer condition.

16. The apparatus of claim 5 in which said transfer control means includes:

static switch current monitoring means responsive to the direction of current through said static switch means for providing static switch current signals corresponding therewith;

direction network means responsive to a commutate signal and to said static switch current signals for deriving select commutating said switch control signals in correspondence therewith to effect commutation of said static switch means to said non-conducting condition; and means deriving a commutate signal in response to said transfer condition.

17. The apparatus of claim 16 in which said transfer control means includes commtuate timing means responsive to said commutate signal for effecting application of said select commutating switch control signals to said inverter solid-state switch means for a predetermined interval.

18. The apparatus of claim 16 in which said transfer circuit means includes:

inverter current monitor means responsive to current flow at said inverter and deriving an inverter overload signal when said current flow exceeds a predetermined value;

said transfer control means is responsive to said inverter overload signal to terminate said commutate signal; and includes retry timing means responsive to said inverter overload signal for reinstating said commutate signal a predetermined interval following said termination thereof.

19. The apparatus of claim 16 in which said transfer control means includes:
  cross-over detect means responsive to said static switch current signals for deriving a cross-over detect signal;
  delay means responsive to the occurrence of a said cross-over detect signal for deriving a timing signal a predetermined interval following the occurrence of said cross-over detect signal; and
  said inverter transfer means is responsive to said delay means to inhibit said commutate signal until the occurrence of said timing signal.

20. An uninterruptible power supply system connectable between a load and a line power source of given frequency, variable voltage and waveshape, comprising:
  static switch means having an input connectable with said line power source and controllable to selectively convey power from said input to an output thereof;
  auxiliary power means for providing a standby d.c. source;
  an inverter having an input connected with said d.c. source for providing an a.c. power output substantially at said given frequency at an inverter output;
  line regulator means connectable with said load, having an input coupled with said inverter output and with said static switch output for synthesizing an output waveform of regulated voltage substantially at said given frequency;
  inductor means coupled intermediate said line regulator means input and said inverter output for effecting current flow limitation; and
  control means for monitoring the condition of said line power source and responsive to predetermined defects therein to terminate said conveyance of power by said static switch means and to effect said provision of a.c. power output from said inverter to said line regulator input.

21. In an uninterruptible power supply system in which a first power path is provided wherein line input a.c. power of first phase is applied through a static switch having actuable switching components to the input of a waveshape synthesizing line regulator coupled to a load, and wherein a second power path is provided in which a stand-by source of d.c. power supplies stand-by power to said regulator input through an inverter having switching components actuable for switching an applied d.c. voltage to derive an unregulated squarewave output of second phase, the method for transferring from said second power path to said first power path comprising:
  providing an inductor in common with the outputs of said static switch and said inverter;
  synchronizing said first and second phases in a manner wherein one is retarded a predetermined amount with respect to the other;
  actuating said static switch switching components to conduct during portions of the cycles of said line input to effect conveyance of gradually increasing amounts of cycle defined energy to said inductor for voltage summing with said squarewave to gradually elevate the value of said applied d.c. voltage; and
  deactivating said inverter switching components when said applied d.c. voltage corresponds with the peak values of voltage exhibited by said line input a.c. power.

22. The method of claim 21 including the step of interlocking said inverter squarewave output with the activation of said static switch components in a manner wherein said static switch components are not actuated simultaneously with the actuation of said inverter switching components.

23. In an uninterruptible power supply system in which a first power path is provided wherein line input a.c. power of given peak voltage level and frequency is applied through a static switch, having switching components actuable between on and commutatable off states, to the input of a waveshape synthesizing line regulator, and wherein a second power path is provided in which a stand-by source of d.c. power supplies stand-by power to said regulator input through an inverter having switch components actuable for switching an applied d.c. inverter voltage to derive a time varying output, the method for transferring from said first power path to said second power path, comprising:
  monitoring currents through said static switch switching components and deriving direction signals representing the direction thereof;
  actuating said static switch switching components to said commutatable off state;
  actuating said inverter switch components in correspondence with said direction signals to effect commutation off of said static switch switching components;
  determining whether the said commutation is effective or ineffective; and
  actuating said inverter switch components to derive said time varying output at said give frequency when said commutation is determined to be effective.

24. The method of claim 23 including the step of precharging said applied d.c. inverter voltage to a level corresponding with said line input given peak voltage level.

25. The method of claim 23 in which:
  said step of actuating said inverter switch components in correspondence with said direction signals is carried out for a predetermined interval;
  including the step of deriving corrected said direction signals when said commutation is determined to be ineffective during said predetermined interval; and
  actuating said inverter switching components in correspondence with said corrected direction signals to effect commutation of said static switch switching components off.

26. The method of claim 23 including the step of providing inductance to limit current flow through said inverter.

27. In an uninterruptible power supply system wherein line input a.c. power of given phase and frequency is applied to a load and wherein an inverter is employed having switch components actuated from the time varying output of an oscillator the frequency and phase of which is controllable for synchronization with said line input by a phase lock loop, the method for detecting a defect in said input comprising the steps of:
  monitoring said line input to provide a corresponding time varying line signal;
  comparing said time varying signal with said time varying output of said oscillator when controlled by said phase lock loop; and
  determining the presence of said defect when the phase of said time varying line signal deviates from the phase of said controlled oscillator time variable signal.

28. Apparatus for use with a waveform synthesizing line regulator having an input and an output connectable with a load, said apparatus being connectable with a line power source of given frequency, variable voltage of given peak value and waveshape and comprising:

static switch means connectable intermediate said source and said line regulator input and actuable between conducting and non-conducting states for selectively conveying power from said source to said regulator input;

means deriving a stand-by source of d.c. power;

an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch controls signal;

inductor means connectable intermediate said inverter output and said line regulator input for effecting current flow limitation; and control means for monitoring the condition of said line power source and responsive to predetermined defects therein to actuate said static switch from said conducting to said non-conducting state and to apply said switch control signals to said solid-state switching means so as to provide said active state control of said inverter and effect a transfer of power flow from said static switch means to said inverter.

29. Apparatus for use with a waveform synthesizing line regulator having an input and an output connectable with a load, said apparatus being connectable with a line power source of given frequency, variable voltage of given peak value and waveshape and comprising:

static switch means connectable intermediate said source and said line regulator input and actuable between conducting and non-conducting states for selectively conveying power from said source to said regulator input;

means deriving a stand-by source of d.c. power;

an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch control signals;

precharge circuit means coupled with said inverter d.c. energy storing bus means for providing, when activated, a d.c. voltage thereat having a predetermined transfer value corresponding with said line power source given peak value; and control means for monitoring the condition of said line power source and responsive to predetermined defects therein to actuate said static switch from said conducting to said non-conducting state and to apply said switch control signals to said solid-state switching means so as to provide said active state control of said inverter and effect a transfer of power flow from said static switch means to said inverter and further responsive to the presence of said predetermined transfer value as a condition for effecting said transfer of power flow.

30. Apparatus for use with a waveform synthesizing line regulator having an input and an output connectable with a load, said apparatus being connectable with a line power source of given frequency, variable voltage of given peak value and waveshape and comprising:

static switch means connectable intermediate said source and said line regulator input and actuable between conducting and non-conducting states for selectively conveying power from said source to said regulator input;

means deriving a stand-by source of d.c. power;

an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch control signals; and control means for monitoring the condition of said line power source including:

cross-over detection network means responsive to said line power source waveshape for deriving a cross-over detect signal corresponding with a zero crossing of said source waveshape, delay means responsive to said cross-over detect signal for deriving a timing signal following a predetermined interval within a period of a half cycle of said waveshape, said control means being responsive to said timing signal and to predetermined defects of said line power source to actuate said static switch from said conducting to said non-conducting state and to apply said switch control signals to said solid-state switching means so as to provide said active state control of said inverter and effect a transfer of power flow from said static switch means to said inverter.

31. Apparatus for use with a waveform synthesizing line regulator having an input and an output connectable with a load, said apparatus being connectable with a line power source of given frequency, variable voltage of given peak value and waveshape and comprising:

static switch means connectable intermediate said source and said line regulator input and actuable between conducting and non-conducting states for selectively conveying power from said source to said regulator input;

means deriving a stand-by source of d.c. power;

an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch control signals; and control means for monitoring the condition of said line power source, and responsive to predetermined defects therein to actuate said static switch from said conducting to said non-conducting state and to apply said switch control signals to said solid-state switching means so as to provide said active state control of said inverter and effect a transfer of power flow from said static switch means to said inverter, said control means including:

static switch current monitoring means for providing a static switch current signals, direction network means responsive to said static switch current signals and to a commutate signal for deriving select said switch control signals in correspondence therewith to effect commutation of said static switch means into said non-conducting state, and inverter transfer circuit means for deriving said commutate signal on the occurrence of a said predetermined defect.

32. The apparatus of claim 31 in which said control means includes commutate timing means responsive to said commutate signal for effecting application of said select switch control signals to said inverter solid-state switching means for a predetermined interval.

33. The apparatus of claim 32 in which said control means includes commutation timing means responsive to said commutate signal for effecting the application of said select switch control signals for a predetermined commutation interval.

34. The apparatus of claim 31 including:

precharge circuit means coupled with said inverter bus means for providing, when activated, a d.c. voltage thereat having a predetermined transfer value corresponding with said line power source given peak value; and aid control means is responsive to the presence of said predetermined transfer value as a condition for effecting said transfer of power flow.

35. The apparatus of claim 31 in which said control mean includes:

inverter current monitor means responsive to current flow at said inverter and deriving an inverter overload signal when said current flow exceeds a predetermined value;

said inverter transfer circuit means is responsive to said inverter overload signal to terminate said commutate signal; and including retry timing means responsive to said inverter overload signal for reinstating said commutate signal a predetermined interval following said termination thereof.

36. The apparatus of claim 31 in which said control means includes:

cross-over detect means responsive to said static switch current signals for deriving a cross-over detect signal;

delay means responsive to the occurrence of a said cross-over detect signal for deriving a timing signal a predetermined interval following the occurrence of said cross-over detect signal; and said inverter transfer circuit means is responsive to said delay means to inhibit said commutate signal until the occurrence of said timing signal.

37. Apparatus for use with a waveform synthesizing line regulator having an input and an output connectable with a load, said apparatus being connectable with a line power source of given frequency, variable voltage of given peak value and waveshape and comprising:

static switch means connectable intermediate said source and said line regulator input and actuable between conducting and non-conducting states for selectively conveying power from said source to said regulator input;

means deriving a stand-by source of d.c. power;

an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch control signals; and control means for monitoring the condition of said line power source and responsive to predetermined defects therein to actuate said static switch from said conducting to said non-conducting state and to apply said switch control signals to said solid-state switching means so as to provide said active state control of said inverter and effect a transfer of power flow from said static switch means to said inverter, said control means including:

commutation interval timing means responsive to said predetermined defects for deriving a predetermined interval for carrying out a commutation of said static switch means to achieve said non-conducting state, and commutation circuit means for communating said static switch means to said non-conducting state by select application of said switch control signals to said inverter solid-state switching means.

38. Apparatus for use with a waveform synthesizing line regulator having an input and an output connectable with a load, said apparatus being connectable with a line power source of given frequency, variable voltage of given peak value and waveshape and comprising:

static switch means connectable intermediate said source and said line regulator input and actuable between conducting and non-conducting states for selectively conveying power from said source to said regulator input;

means deriving a stand-by source of d.c. power;

an inverter including d.c. energy storing bus means for connection in energy exchange relationship with said stand-by source, solid-state switch means coupled with said bus means and responsive to switch control signals to provide an inverter active state for deriving an unregulated power input to said line regulator input at said given frequency, and said inverter having a non-switching stand-by state in the absence of said switch control signals; and control means for monitoring the condition of said line power source and responsive to predetermined defects therein to actuate said static from said conducting to said non-conducting state and to apply said switch control signals to said solid-state switching means so as to provide said active state control of said inverter and effect a transfer of power flow from said static switch means to said inverter, said control means including commutation circuit means for commutating said static switch means to said non-conducting state by select application of said switch control signals to said inverter solid-state switching means.

39. The apparatus of claim 38 in which said control means includes:

precharge circuit means coupled with said inverter bus means for providing, when activated, a d.c. voltage thereat having a predetermined transfer value corresponding with said line power given peak value; and said control means effects said precharge circuit means activation when said static switch means is in said conducting state.

* * * * *